United States Patent
Chen et al.

(10) Patent No.: US 11,394,307 B2
(45) Date of Patent: Jul. 19, 2022

(54) RESONANT POWER CONVERTERS AND CONTROL METHODS FOR WIDE INPUT AND OUTPUT VOLTAGE RANGES

(71) Applicant: Queen's University at Kingston, Kingston (CA)

(72) Inventors: Yang Chen, Hefei (CN); Yan-Fei Liu, Kingston (CA)

(73) Assignee: Queen's University at Kingston, Kingston (CA)

(*) Notice: Subject to any disclaimer, the term of this patent is extended or adjusted under 35 U.S.C. 154(b) by 6 days.

(21) Appl. No.: 16/965,171

(22) PCT Filed: Jan. 28, 2019

(86) PCT No.: PCT/CA2019/050100
§ 371 (c)(1),
(2) Date: Jul. 27, 2020

(87) PCT Pub. No.: WO2019/144241
PCT Pub. Date: Aug. 1, 2019

(65) Prior Publication Data
US 2020/0366215 A1    Nov. 19, 2020

Related U.S. Application Data

(60) Provisional application No. 62/627,976, filed on Feb. 8, 2018, provisional application No. 62/623,020, filed on Jan. 29, 2018.

(51) Int. Cl.
*H02M 3/335* (2006.01)
*H02M 3/00* (2006.01)
(Continued)

(52) U.S. Cl.
CPC ... *H02M 3/33592* (2013.01); *H02M 3/33576* (2013.01); *H02M 1/0058* (2021.05); *H02M 1/10* (2013.01); *H02M 3/015* (2021.05)

(58) Field of Classification Search
CPC ............... H02M 1/0085; H02M 1/10; H02M 3/01–015; H02M 3/335–3378
See application file for complete search history.

(56) References Cited

U.S. PATENT DOCUMENTS 7,944,716 B2    5/2011   Halberstadt
8,222,872 B1 *  7/2012   Melanson ............. H02M 3/155
                                                      323/222

(Continued)

FOREIGN PATENT DOCUMENTS

CN    107147199 A  *  9/2017  ............. H02J 50/12
KR    101492964 B1 *  2/2015

OTHER PUBLICATIONS

International Search Report and Written Opinion for corresponding international application No. PCT/CA2019/050100 filed on Jan. 28, 2019.

*Primary Examiner* — Fred E Finch, III
(74) *Attorney, Agent, or Firm* — Stephen J. Scribner

(57) ABSTRACT

Resonant converters with wide voltage gain ranges are achieved by controlling at least one of the primary side resonant circuit and the secondary side rectifier circuit. A switch is included in at least one of the primary or secondary sides, and control of the switch according to a selected mode determines an output voltage of the resonant converter. Embodiments accommodate wide input and output voltage ranges, and are suitable for use in AC-DC power adapters for portable devices with different voltage requirements, such as cell phones, tablets, and notebook computers, as well as in DC-DC converter applications including electric vehicle power systems.

16 Claims, 14 Drawing Sheets

(51) Int. Cl.
*H02M 1/00* (2006.01)
*H02M 1/10* (2006.01)

(56) References Cited

U.S. PATENT DOCUMENTS

| | | |
|---|---|---|
| 9,030,846 B2 | 5/2015 | Bai et al. |
| 9,729,070 B2 * | 8/2017 | Liu .................. H02M 3/33546 |
| 9,780,687 B2 | 10/2017 | Chen et al. |
| 10,476,397 B2 * | 11/2019 | Liu .................. H02M 3/33546 |
| 10,720,849 B2 * | 7/2020 | Mao ........................ H02J 50/12 |
| 2008/0259647 A1 * | 10/2008 | Risseeuw .............. H02M 3/158 |
| | | 363/21.1 |
| 2015/0124487 A1 * | 5/2015 | Fu ..................... H02M 3/33507 |
| | | 363/17 |
| 2015/0124490 A1 * | 5/2015 | Sanuki .............. H02M 3/33546 |
| | | 363/17 |
| 2016/0190945 A1 | 6/2016 | Liu et al. |
| 2018/0234028 A1 * | 8/2018 | Chen .................. H02M 1/4233 |
| 2018/0248489 A1 * | 8/2018 | Wang ............... H02M 3/33507 |
| 2018/0358844 A1 * | 12/2018 | Yu ....................... H02J 7/00712 |
| 2020/0007044 A1 * | 1/2020 | Sato ........................ H02M 1/08 |

* cited by examiner

RESONANT POWER CONVERTERS AND CONTROL METHODS FOR WIDE INPUT AND OUTPUT VOLTAGE RANGES

FIELD

This invention relates to power converters for power delivery to electronic devices and electric vehicles. More specifically, the invention relates to circuits and control methods for delivering a wide range of output voltages from a single power converter.

BACKGROUND

Currently, the USB Power Delivery Standard (USB-PD) is proposed to solve the problem of incompatible output voltage levels of power adapters for cell phones, tablets, and notebook computers. The PD compatible power adapters are able to convert a universal AC voltage (such as 120V and 220V) to DC voltage and provide an output voltage adjustable from 5V to 20V for portable devices, such as cell phones, tablets, and notebook computers. The power adapter will communicate with the device it is charging, and then produce the required output voltage level that matches the need of the device. Therefore, the same power adapter can be used for multiple devices which are compatible to USB-PD. The output power of a PD adapter may be as high as 100 W (20V, 5 A).

A resonant converter is a good choice for a USB-PD charger because of features such as zero-voltage switching (ZVS) and high switching frequency operation, which reduces the overall size of the power adapter. However, in order to achieve 5V to 20V output variation range, the switching frequency of the resonant converter must be changed over wide range (such as more than 3:1 ratio). When the voltage gain variation range is designed to be very wide, performance (such as efficiency) and power density are degraded.

Other applications also require very wide voltage gain variation range. One example is the DC-DC converter of an electric vehicle (EV) power system, which may have to provide 9V to 16V output voltage with 240V to 430V input voltage. This represents a voltage gain from 0.021 to 0.067, or a variation range of about 3.2 times, which is also a very challenging requirement for resonant converters. To maintain such a large voltage gain variation range, the design of the resonant converter is compromised and efficiency cannot be optimized.

SUMMARY

According to one aspect of the invention there is provided a resonant converter, comprising: first and second primary side input terminals; a primary side resonant circuit including two or more switches; a transformer having primary and secondary windings; a secondary side rectifier circuit; output points of the secondary side rectifier circuit connected to first and second secondary side output terminals; a control switch; an output capacitor connected across the first and second output terminals; and at least one controller that controls a control switch according to a selected mode; wherein a voltage at the first and second output terminals is variable according to the selected mode.

In one embodiment, the resonant converter further comprises a secondary side blocking capacitor; wherein the control switch is a secondary side control switch; wherein a first terminal of the blocking capacitor is connected to the transformer secondary winding and a second terminal of the blocking capacitor is connected to a second input terminal of the rectifier circuit; wherein a first terminal of the secondary side control switch is connected to the second terminal of the blocking capacitor and a second terminal of the secondary side control switch is connected to the second output point of the rectifier circuit; wherein the at least one controller controls the secondary side control switch according to a first selected mode so that when the secondary side control switch is off, the output voltage of the resonant converter is Vo, and according to a second selected mode so that when the secondary side control switch is on, the output voltage of the resonant converter is 2Vo.

In one embodiment, the at least one controller controls a switching frequency of the resonant converter according to a lower switching frequency when the secondary side control switch is off, and according to a higher switching frequency when the secondary side control switch is on.

In one embodiment, the at least one controller controls a duty cycle of the secondary side control switch during a transition from off to on, wherein the duty cycle gradually increases from 0 to 1 during switching cycles over a first selected duration; and wherein the at least one controller controls the duty cycle of the secondary side control switch during a transition from on to off, wherein the duty cycle gradually decreases from 1 to 0 during switching cycles over a second selected duration.

In one embodiment, the first selected duration corresponds to a duration in which a switching frequency of the resonant converter is increasing; and wherein the second selected duration corresponds to a duration in which the switching frequency of the resonant converter is decreasing.

In one embodiment, the at least one controller controls a duty cycle of the secondary side control switch within each switching cycle; wherein the output voltage of the resonant converter is determined by the duty cycle of the secondary side control switch within each switching cycle; wherein the output voltage of the resonant converter is variable from Vo to 2Vo.

In one embodiment, the at least one controller controls the secondary side control switch by: turning on the secondary side control switch during alternating negative halves of the transformer secondary current cycle; and otherwise turning off the secondary side control switch; wherein the output voltage of the resonant converter is between Vo and 2Vo.

In one embodiment, the at least one controller controls the secondary side control switch by: turning on the secondary side control switch during a selected number of consecutive negative halves of the transformer secondary current cycle; turning off the secondary side control switch during a selected number of consecutive negative halves of the transformer secondary current cycle; and otherwise turning off the secondary side control switch; wherein the output voltage of the resonant converter is between Vo and 2Vo.

In another embodiment, the resonant converter comprises a secondary side blocking capacitor; wherein the secondary side control switch is implemented with synchronous rectifiers arranged in a full bridge configuration; wherein a first terminal of the transformer secondary winding is connected to a first common point of first and third synchronous rectifiers of the full bridge; wherein a second terminal of the transformer secondary winding is connected to a first terminal of the blocking capacitor, and a second terminal of the blocking capacitor is connected to a second common point of second and fourth synchronous rectifiers of the full bridge; wherein the at least one controller controls the synchronous rectifiers according to a first selected mode so that the output voltage of the resonant converter is Vo, and according to a second selected mode so that the second synchronous rectifier is off and the fourth synchronous rectifier is on, and the output voltage of the resonant converter is 2Vo.

According to another embodiment, a reactive element of the primary side resonant circuit comprises first and second reactive elements; and the control switch is a primary side control switch; wherein the primary side control switch is connected to the first and second reactive elements; wherein the at least one controller controls the primary side control switch according to a selected mode; wherein the selected mode changes a total reactance of the first and second reactive elements; wherein a voltage at the first and second output terminals is variable according to the selected mode.

In one embodiment, the first and second reactive elements are first and second capacitors; wherein the selected mode changes a total capacitance of the first and second capacitors.

In one embodiment, the first and second reactive elements are first and second inductors; wherein the selected mode changes a total inductance of the first and second inductors.

In one embodiment, the at least one controller controls the primary side control switch according to a first mode in which the primary side control switch is off, and a second mode in which the primary side control switch is on.

In one embodiment, the at least one controller controls the primary side control switch according to a mode wherein the control switch is alternately off and on during consecutive switching cycles; wherein the voltage at the first and second output terminals is between K*Vo and Vo, where K is a number between 0 and 1.

In one embodiment, the at least one controller controls the primary side control switch according to a mode wherein the primary side control switch is off during a selected number of consecutive switching cycles, and on during a selected number of consecutive switching cycles; wherein the voltage at the first and second output terminals is between K*Vo and Vo, where K is a number between 0 and 1.

According to another embodiment, the resonant converter comprises a primary side control switch and a secondary side control switch; wherein a reactive element of the primary side resonant circuit comprises first and second reactive elements; wherein the primary side control switch is connected to the first and second reactive elements; wherein the at least one controller controls the primary side control switch according to a third selected mode; wherein the third selected mode changes a total reactance of the first and second reactive elements; wherein a voltage at the first and second output terminals is variable between K*Vo and 2Vo, where K is a number between 0 and 1, according to the first, second, and third selected modes.

According to further aspects of the invention, there are provided methods for controlling a resonant converter including a primary side control switch, or a secondary side control switch, or primary side and secondary side control switches, as described herein. In various embodiments, the methods may include controlling the primary side control switch, or the secondary side control switch, or the primary side and secondary side control switches, according to a selected mode, wherein a voltage at the first and second output terminals is variable according to the selected mode.

In one embodiment, the method comprises controlling the secondary side control switch according to a first selected mode so that when the secondary side control switch is off, the output voltage of the resonant converter is Vo, and according to a second selected mode so that when the secondary side control switch is on, the output voltage of the resonant converter is 2Vo.

In one embodiment, the method comprises controlling a switching frequency of the resonant converter according to a lower switching frequency when the secondary side control switch is off, and according to a higher switching frequency when the secondary side control switch is on.

In one embodiment, the method comprises controlling a duty cycle of the secondary side control switch during a transition from off to on, wherein the duty cycle gradually increases from 0 to 1 during switching cycles over a first selected duration; and controlling the duty cycle of the secondary side control switch during a transition from on to off, wherein the duty cycle gradually decreases from 1 to 0 during switching cycles over a second selected duration. In one embodiment, the first selected duration corresponds to a duration in which a switching frequency of the resonant converter is increasing; and the second selected duration corresponds to a duration in which the switching frequency of the resonant converter is decreasing.

In one embodiment, the method comprises controlling a duty cycle of the secondary side control switch within each switching cycle; wherein the output voltage of the resonant converter is determined by the duty cycle of the secondary side control switch within each switching cycle; wherein the output voltage of the resonant converter is variable from Vo to 2Vo.

In one embodiment, the method comprises controlling the secondary side control switch by: turning on the secondary side control switch during alternating negative halves of the transformer secondary current cycle; and otherwise turning off the secondary side control switch; wherein the output voltage of the resonant converter is between Vo and 2Vo.

In one embodiment, the method comprises controlling the secondary side control switch by turning on the secondary side control switch during a selected number of consecutive negative halves of a resonant transformer secondary current cycle; turning off the secondary side control switch during a selected number of consecutive negative halves of the transformer secondary current cycle; and otherwise turning off the secondary side control switch; wherein the output voltage of the resonant converter is between Vo and 2Vo.

In one embodiment, the method comprises controlling synchronous rectifiers according to a first selected mode wherein the output voltage of the resonant converter is Vo, and according to a second selected mode so that wherein the output voltage of the resonant converter is 2Vo.

In one embodiment, the method comprises controlling the primary side control switch according to a selected mode; wherein the selected mode changes a total reactance of primary side reactive elements; wherein a voltage at the first and second output terminals is variable according to the selected mode.

In one embodiment, the method comprises controlling the primary side control switch according to a mode wherein the control switch is alternately off and on during consecutive switching cycles; wherein a voltage at the first and second output terminals is between K*Vo and Vo, where K is a number between 0 and 1.

In one embodiment, the method comprises controlling the primary side control switch according to a mode wherein the primary side control switch is off during a selected number of consecutive switching cycles, and on during a selected number of consecutive switching cycles; wherein the voltage at the first and second output terminals is between K*Vo and Vo, where K is a number between 0 and 1.

In one embodiment, the method comprises controlling the secondary side control switch according to first and second selected modes, and controlling the primary side control switch according to a third selected mode; wherein the third selected mode changes a total reactance of primary side reactive elements; wherein a voltage at the first and second output terminals is variable between K*Vo and 2Vo, where K is a number between 0 and 1, according to the first, second, and third selected modes.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Aspects and embodiments described herein, and variations thereof, are suitable for applications requiring wide input voltage and output voltage ranges. For example, applications may include AC-DC power delivery for low-voltage personal electronic devices such as cell phones, tablets, and laptop computers. Since the embodiments can provide a range of output voltage ranges to accommodate such devices, a single power delivery device may be used for all such devices.

Embodiments are also well-suited to DC-DC applications, including high-voltage applications such as electric vehicle (EV) charging. Since the embodiments can provide a wide range of output voltages, a single embodiment can accommodate different voltages required for different types of EVs (e.g., cars may require lower voltages than large vehicles such as trucks and buses).

Further, embodiments can accommodate a wide range of input voltages as may be determined by location (due to, for example, different line voltages such as 110-120 VAC in North America and 220-240 VAC in Europe) while maintaining the wide output voltage range.

I. Secondary Side Control Switch

According to a first aspect of the invention, variable output of an AC-DC resonant converter is achieved by implementing control of the secondary side DC output voltage.

Figure 1:
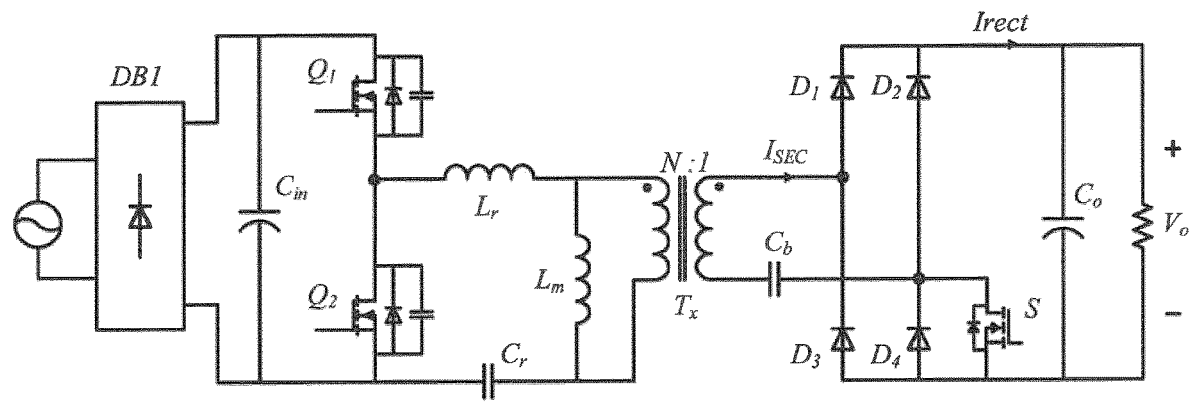
FIG. 1 is a schematic diagram of a resonant converter, according to one embodiment.

FIG. 1 shows a resonant converter according one embodiment. The primary side is an LLC topology with half bridge switches Q1 and Q2, resonant inductor Lr, magnetizing inductor Lm, and resonant capacitor Cr. The secondary side includes a full bridge rectifier (D1-D4), a blocking capacitor Cb, and one switch S, which may be referred to herein as a "doubler" switch or a "control" switch. The switch S may be, for example, a MOSFET. In some embodiments, to save cost and/or to reduce complexity, D4 can be removed and the body diode of switch S can serve as D4.

The embodiment of FIG. 1 includes a conventional primary side topology. In other embodiments, other topologies with a current source as an output, such as an LLC resonant converter, including an PWM converter, such as an isolated boost converter, etc., may also be used.

Operation of the embodiment of FIG. 1 will be described with respect to the secondary side, since the primary side operates as a conventional converter. There are several operating modes. According to a first operating mode, the full bridge rectifier operates substantially normally (non-doubler), in which case the output voltage value is denoted as Vo. In a second operating mode, the full bridge rectifier operates as a voltage doubler. In this mode the output voltage is twice the voltage in the first (full bridge) mode, i.e. 2Vo.

In the following, a detailed description of the first and second operating two modes is provided. A simulation was conducted using PSIM (PowerSim, Rockville, Md., USA) based on the design parameters of Table 1, with output voltage Vo=10V for non-doubler mode, and 2Vo=20V for voltage doubler mode of operation.

TABLE 1

Design Parameters

| | |
|---|---|
| Input voltage of LLC: VCin | 340 V |
| Lr | 16 µH |
| Cr | 1.33 nF |
| Lm | 65 µH |
| Transformer turns ratio: N | 18:1 |
| Cb | 10 µF |
| Co | 300 µF |
| Io | 3 A |
| Switching frequency: fs | 1 MHz |
| Output voltage in non-doubler mode: Vo | 10 V |
| Output voltage in doubler mode: 2Vo | 20 V |

Non-Doubler Operation Mode

Figure 2A:
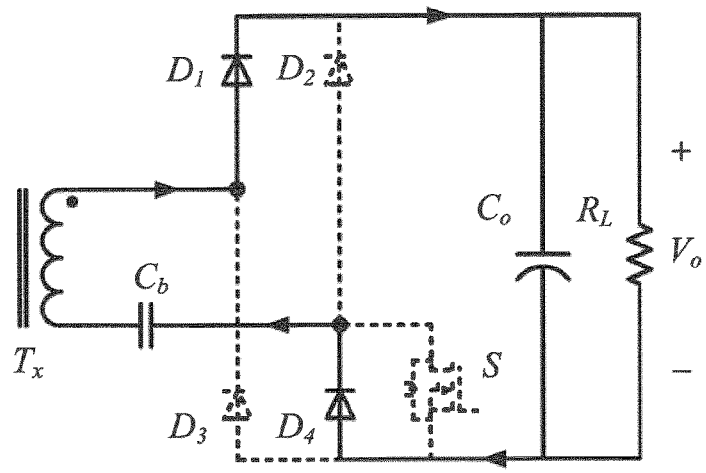
FIGS. 2A and 2B are schematic diagrams showing equivalent circuits of the secondary side of the embodiment of FIG. 1, during the positive and negative half cycles, respectively, of a non-voltage doubler mode of operation.
Figure 2B:
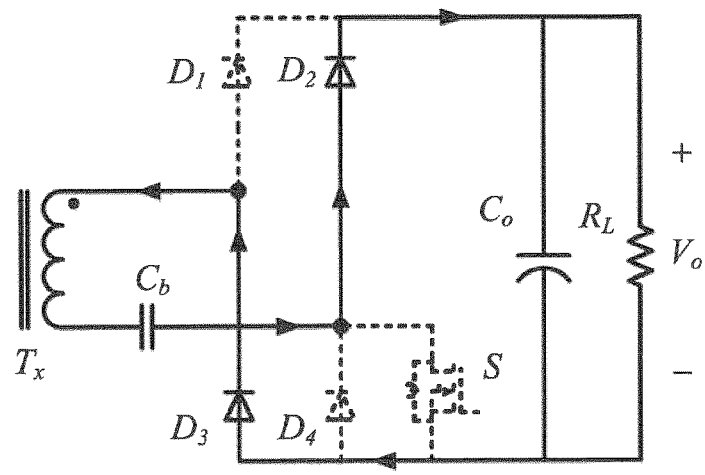

When the switch S in FIG. 1 is not turned on, effectively S does not have any impact on the circuit operation, and the rectifier operates as a full bridge rectifier. The equivalent circuits of the positive and negative halves of the switching cycle are shown in FIGS. 2A and 2B, where the dashed lines show parts of the circuit that are not in operation.

In the positive half cycle, the current direction is from Tx to D1, Co and RL, then D4 and Cb, as shown in solid line. If the body diode of the switch S has lower forward voltage drop than D4, then it will conduct and D4 will not conduct. However, for the most part, D4 will be selected such that it has lower forward voltage drop.

In the negative half cycle, the current direction is from Tx to Cb, D2, then Co and RL, and D3, as shown in solid line.

In steady state, the current in the positive (ID1) and negative half cycle (ID3) has same magnitude but opposite direction. The blocking capacitor will be charged and discharged, respectively, once in a full switching cycle. Thus, the blocking capacitor Cb will carry no DC voltage (VCb=0 V) but some switching-frequency level voltage ripple. In practice, the DC voltage across Cb may be a very small value.

Doubler Operation Mode

When the control switch S in FIG. 1 is turned on all the time, the rectifier operates as a voltage doubler rectifier. The equivalent circuits of the positive and negative halves of the switching cycle are shown in FIGS. 3A and 3B, where the dashed lines show parts of the circuit that are not in operation.

Figure 3A:
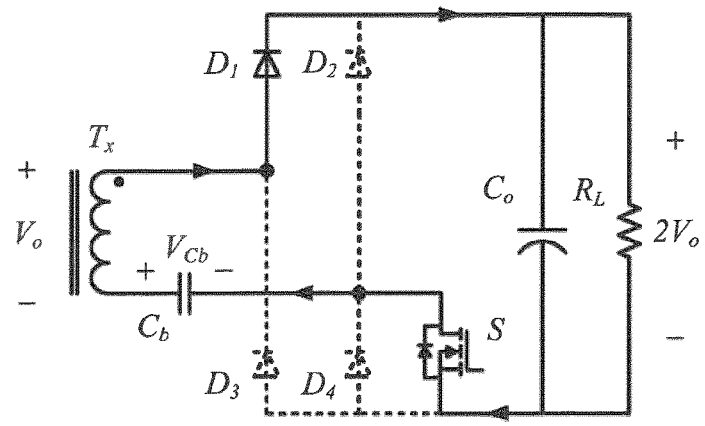
FIGS. 3A and 3B are schematic diagrams showing equivalent circuits of the secondary side of the embodiment of FIG. 1, during the positive and negative half cycles, respectively, of a voltage doubler mode of operation.

In the positive half cycle, shown in FIG. 3A, the current ID1 is from Tx to D1, Co and RL, then S and Cb, as shown in solid line. The voltage on the transformer winding is Vo, same as in the non-doubler mode. In steady state, the blocking capacitor Cb will carry a DC voltage of VCb, with a value of Vo. The capacitor is charged in the negative half cycle. Thus, the actual output voltage is the sum of the transformer voltage and VCb, i.e., V=2Vo.

Figure 3B:
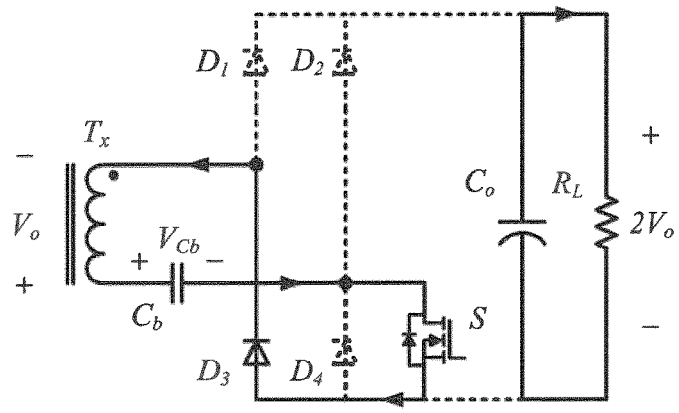

In the negative half cycle, shown in FIG. 3B, the current ID3 conduction path is from Tx to Cb, S and D3, as shown in solid line. The transformer winding voltage is Vo. Thus, the capacitor is charged to Vo in steady state. The output power is provided by the output capacitor Co during the negative half cycle. Therefore, the load power is transferred only during the positive half cycle by ID1.

It is noted that the voltage on the blocking capacitor Cb is different in doubler and non-doubler operation. In doubler mode, Cb carries a DC voltage the same as the winding voltage (VCb=10V), as well as high frequency voltage ripple. In non-doubler mode, Cb only has high frequency voltage ripple with its DC value close to zero.

In this embodiment, in voltage doubler operation mode, during half of the switching cycle, energy is provided to the output by both the resonant current and the DC blocking capacitor. Therefore, the output voltage is higher. During the other half of the switching cycle, the DC blocking capacitor is charged by the resonant current to keep its voltage at the output voltage level, Vo.

Comparing the current in the diodes for the non-doubler mode of operation and the doubler mode of operation, it can be observed that both ID1 and ID3 contribute to the load current in non-doubler mode of operation, while in the doubler mode of operation, only the current in the positive half cycle, i.e., ID1, is transferred to the load. As a result, in doubler mode, the diode current stress is doubled as compared to the non-doubler mode, provided the same load current.

Synchronous Rectifier Voltage Doubler

Figure 4:
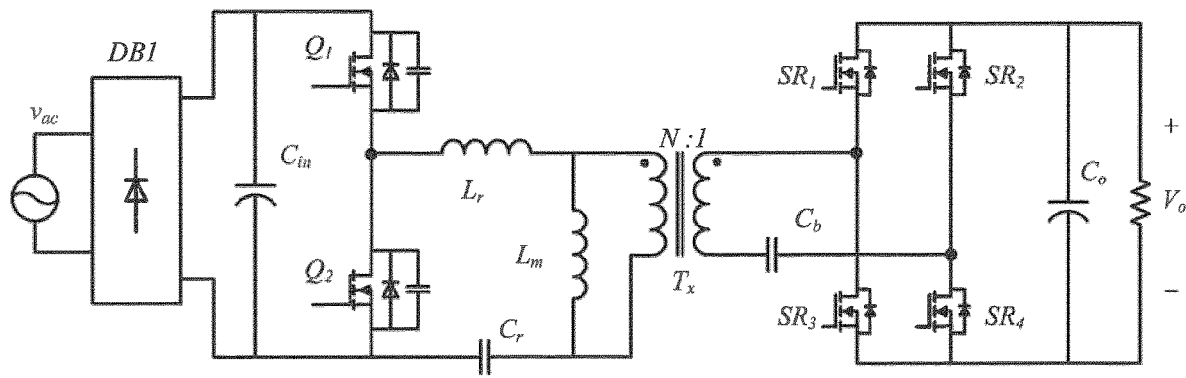
FIG. 4 is a schematic diagram of a resonant converter with secondary side implemented with synchronous rectifiers, according to one embodiment.

In low output voltage applications, a synchronous rectifier may be used to reduce the conduction loss of the rectifier. FIG. 4 shows an embodiment implanted with synchronous rectifiers (SR). With SRs, the rectifier circuit still operates in the doubler and non-doubler mode. However, no additional component other than the blocking capacitor Cb is needed to achieve the two operation modes.

Figures 5A, 5B:
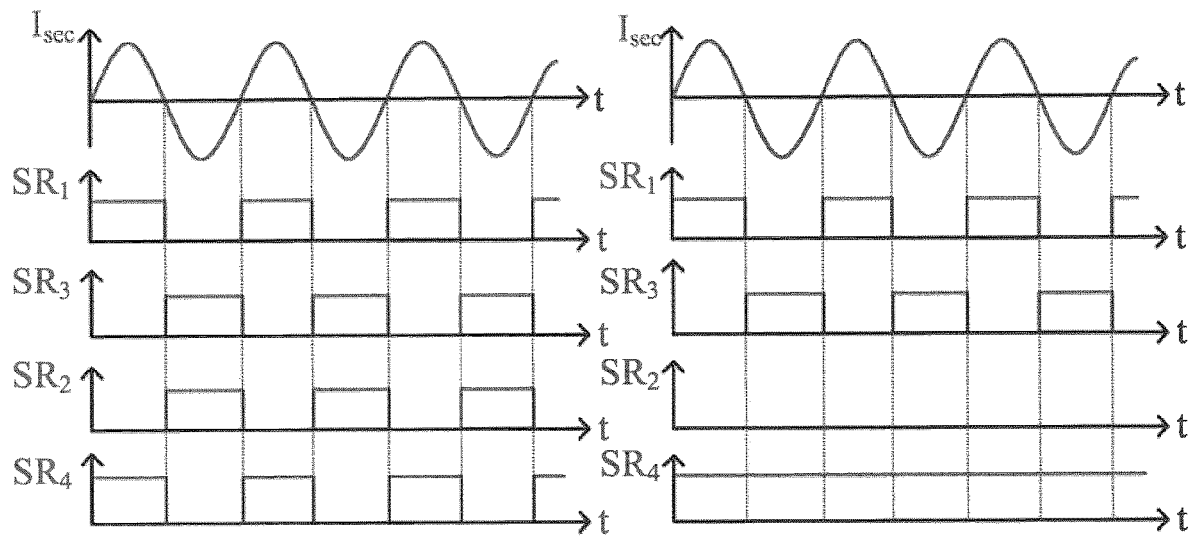
FIGS. 5A and 5B show gate drive waveforms for synchronous rectifiers of the embodiment of FIG. 4, in non-voltage doubler and voltage doubler modes, respectively.

In non-doubler operation, SR1 and SR4 conduct during the positive half cycle, while SR2 and SR3 conduct during the negative half cycle. This operation is the same as a conventional full bridge rectifier with synchronous rectifiers. Cb has only high frequency voltage ripple and no DC voltage. The gate drive waveforms for SR1 to SR4 are shown in FIG. 5A.

In voltage doubler operation, SR2 is always turned off, and SR4 is always on. SR1 and SR3 will be on and off alternatively. In this case, Cb will have a DC voltage bias of the output voltage. The gate drive waveforms for SR1 to SR4 are shown in FIG. 5B.

Smooth Transition Between Voltage Doubler and Non-Voltage Doubler Modes of Operation In some embodiments, the designed output voltages of the doubler mode and the non-doubler mode overlap. This may result in a current surge and a voltage spike during the transition between the two modes of operation. For example, if the output voltage range is continuous from 5V to 20V, then the non-doubler operation should be used when the output voltage is between 5V and 10V, and doubler mode operation should be used for the output voltage between 10V and 20V. Then, at 10V, the operation is switched from non-doubler mode to doubler mode. That is, the output voltage should be regulated at the same voltage (10V in this example) for both non-voltage doubler operation and voltage doubler operation. This change of operation mode may create an output voltage spike, caused by delay in the control loop. The following embodiments eliminate the voltage spike, or reduce it to an acceptable level.

As used herein, a smooth transition means that there is either no voltage (or current) spike, or only a very small voltage (or current) spike that may be considered negligible.

One embodiment is based on the circuit shown in FIG. 1, with the design parameters shown in Table 2. In this embodiment switching frequency control is used to regulate the output voltage when the doubler rectifier mode or non-doubler rectifier mode is selected. As shown in the example of Table 2, for the non-doubler mode the switching frequency at steady state is about 600 kHz, and for the doubler mode is about 1 MHz to achieve output voltage of 10V. In other embodiments, such as PWM converters, variable duty cycle is used for control instead of switching frequency. In a battery charging application, the output voltage is increased as the battery being charged. Thus, the transition happens only from non-doubler to doubler operation. In other cases, the transition could happen both ways (either from non-doubler operation to doubler operation or from doubler operation to non-doubler operation).

TABLE 2

Design Parameters for a Smooth Transition between Modes of Operation

| | |
|---|---|
| Input voltage of LLC: VCin | 340 V |
| Lr | 20 μH |
| Cr | 1 nF |
| Lm | 90 μH |
| Transformer turns ratio: N | 36:1 |
| Cb | 10 μF |
| Co | 300 μF |
| Io | 3 A |
| Output voltage (frequency) in non-doubler mode | 5 V (1 MHz)-10 V (600 kHz) |
| Output voltage (frequency) in doubler mode | 10 V (1 MHz)-20 V (600 kHz) |

Figure 6:
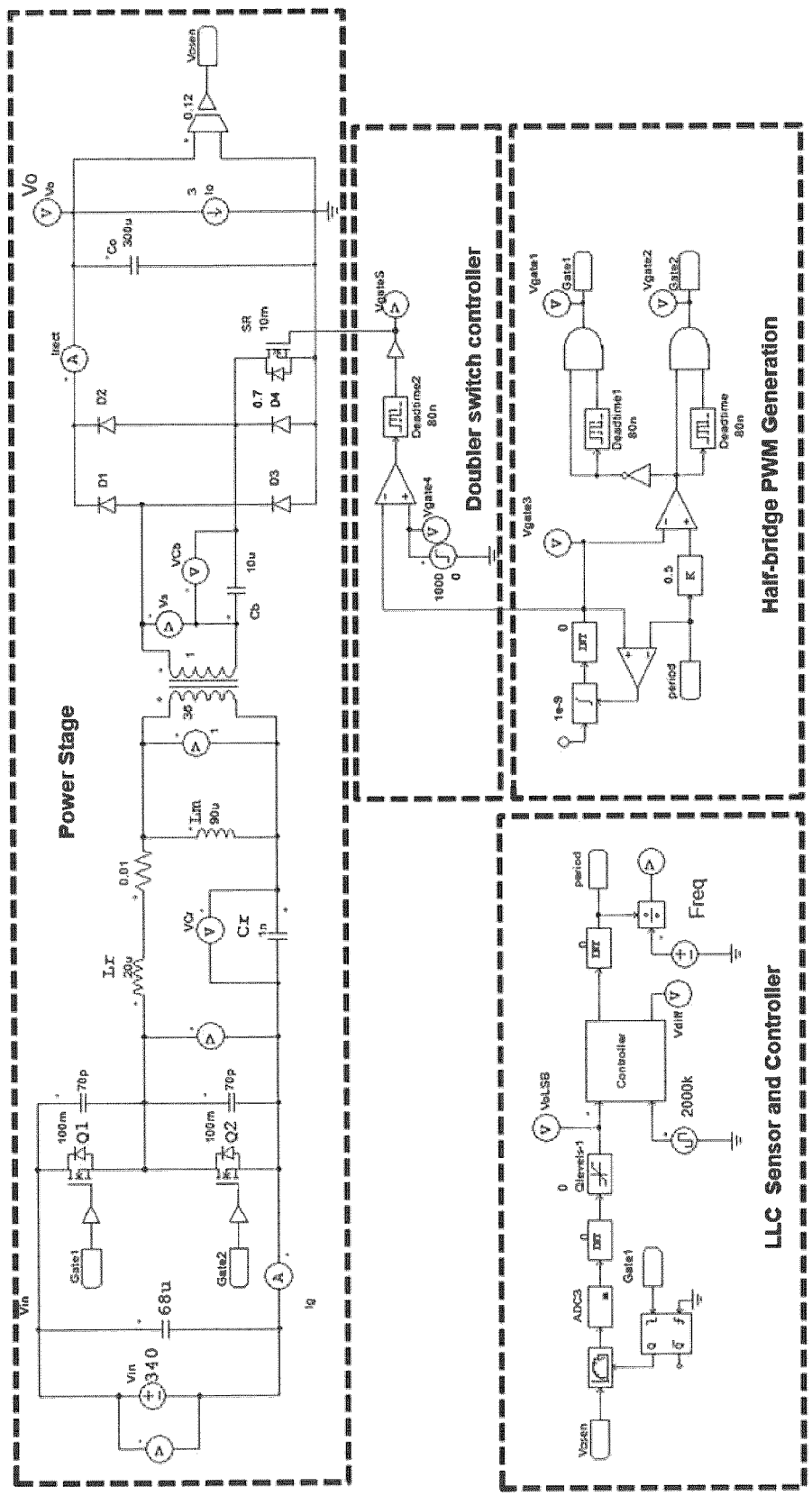
FIG. 6 is a schematic diagram of an implementation of a resonant converter and control circuitry, according to one embodiment.

FIG. 6 is a schematic diagram of the power stage and control circuit. In the LLC sensor and controller, the output voltage is sensed by the controller, and a PI closed-loop control is implemented inside the controller. A half-bridge PWM generation circuit generates the gate drive signals for the primary side switches Q1 and Q2. A doubler switch controller is used to generate the turn-on and turn-off signals for the doubler switch S. In an alternative embodiment, the controller generates a gradually increasing/decreasing duty cycle for the doubler switch S, as described below. In one embodiment this may be implemented by a gradually increasing or decreasing reference signal being compared with a triangular ramp signal operating dynamically at the switching frequency. The changing slope of the reference signal is controlled so that the transition period can be controlled.

Closed Loop Control

When the voltage doubler switch S is turned on, the circuit changes the operation mode from non-voltage doubler mode to voltage doubler mode. In the example, the switching frequency is changed from 600 kHz to 1 MHz by a feedback loop. The switching frequency cannot change immediately due to the delay of the feedback loop, and may require, e.g., 500 μs for the transition, which will cause the output voltage to increase. For example, the output voltage will increase towards 20V from an initial value of 10V. Then, through feedback control, the output voltage will recover to the original value. Because of the delay in the feedback loop, a voltage spike during the transition may be relatively large, such as 20% of the initial voltage level. For example, a simulation indicated that the output voltage will rise from 10V to as high as 12V and then recover to 10V again. A faster feedback loop will reduce the voltage spike.

Similarly, when the voltage doubler switch S is turned off, the circuit will change the operation mode from voltage doubler mode to non-voltage doubler mode. In the example, the switching frequency is changed from 1 MHz to 600 kHz by feedback loop. The switching frequency cannot change immediately due to the delay of the feedback loop, and may require, e.g., 400 μs for the transition, which will cause the output voltage to decrease. For example, the output voltage will decrease towards 5V from an initial value of 10V. Then, through feedback control, the output voltage will recover to the original value. Because of the delay in the feedback loop, the voltage spike during the transition may be relatively large, such as 20% of the initial voltage level. For example, a simulation indicated that the output voltage will decrease from 10V to as low as 8.5V and then recover to 10V. Again, implementing a fast feedback loop will reduce the voltage spike.

Closed Loop and Switching Frequency Feedforward

In order to reduce the voltage spike, switching frequency feedforward may be used. It is observed that when the converter operates in non-voltage doubler mode, and the output voltage is at the high end of the output voltage range, such as 10V, the switching frequency is at lower end of the switching frequency range, such as at 600 kHz. When the converter is switched into voltage doubler mode, the feedback circuit will increase the switching frequency to the higher end of the switching frequency range, such as 1 MHz, to maintain same output voltage.

Therefore, switching frequency feedforward may be used to reduce the voltage spike. According to one embodiment, as soon as the converter is switched from non-voltage doubler operation to voltage doubler operation by turning on the voltage doubler switch S, the switching frequency is increased from the lower end of the switching frequency range to a pre-determined higher switching frequency, such as from 600 kHz to 1 MHz. This way, the transition time is reduced and the voltage spike can be reduced.

In one simulation based on the above example, when switching frequency feedforward was used for the transition from non-doubler mode to doubler mode, the transition time was reduced to about 50 μs and the voltage spike was reduced to about 0.15V (for 10V output voltage). Similarly, when the converter is switched from voltage doubler operation to non-voltage doubler operation, the switching frequency is reduced to a pre-determined value, such as from 1 MHz to 600 kHz. The simulation showed that the transition time was reduced to about 50 μs and the voltage spike was also limited to about 0.3V.

Gradual Transition of Switch S

It is observed from the above description of the closed loop that during the transition, the output voltage will have overshoot or undershoot, which is not desirable. It is observed that when the rectifier operates in non-doubler mode, the control switch S is always off, or equivalently, its duty cycle is zero. When the rectifier operates in doubler mode, the switch S is always on, or equivalently, its duty cycle is one (or 100%). The voltage overshoot or undershoot during the transition results from the energy imbalance between non-doubler mode and doubler mode. According to another embodiment, the duty cycle of the doubler switch S is changed gradually during the transition, which reduces the impact of the energy imbalance and the voltage overshoot and undershoot.

Figure 7:
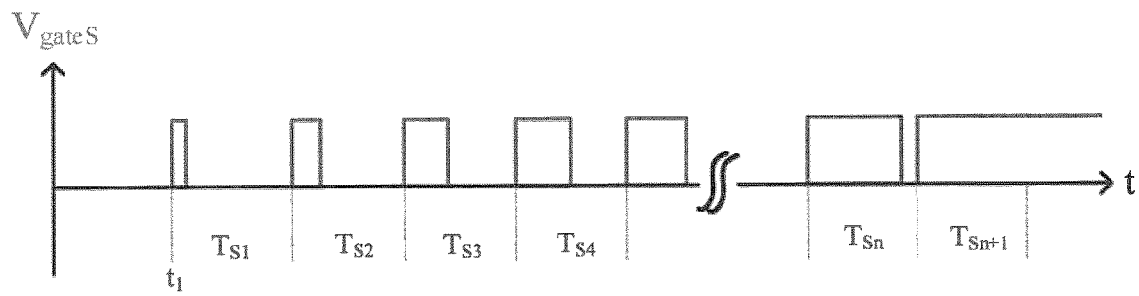
FIG. 7 is a timing diagram showing a gating signal for a switch that controls non-voltage doubler and voltage doubler modes, according to one embodiment.

FIG. 7 shows a gating signal for a gradual change in the duty cycle of switch S during the transition from non-voltage doubler operation to voltage doubler operation. It is assumed that at time t1, the circuit starts the transition. At the first switching period, Ts1, the duty cycle of S is very small, such as 2%. The duty cycle of the switch S increases slowly after each switching period, as shown in FIG. 7. Near the end of the transition, the duty cycle is close to 1 (i.e., 100%). When the duty cycle is 100%, the transition is finished and the converter operates in voltage doubler mode. As long as the duty cycle increases slowly enough, the output voltage spike may be controlled to be very small. A simulation result showed that with a gradual increase in the duty cycle of switch S, the output voltage spike during the transition is less than 0.05V, which is very small for 10V steady state voltage.

According to this embodiment, the gradual change in duty cycle may be implemented over, e.g., a 1 ms to 10 ms time period, or 100 to 1,000 switching cycles, although other time periods or numbers of switching cycles may be used. For example, consider an embodiment such as that shown in FIG. 6 with switching frequencies of 600 kHz and 1 MHz, and both a closed-loop controller and PWM control of the doubler switch S. Before the switching cycle Ts1 (FIG. 7), S remains off, thus the rectifier is operating in non-doubler mode and the duty cycle of S is zero. At the instant of Ts1, S is turned on for a short period in each switching cycle. The duty cycle is then increased to 100% gradually over a duration of n switching cycles Tsn, e.g., a duration of 200 µs. After that, S remains as on, and the rectifier operates in doubler mode. During the period that the duty cycle is changing, the closed-loop controller changes the switching frequency from 600 kHz to 1 MHz to regulate the output voltage. With the two controllers in synergy, the voltage overshoot is reduced to very small value, such as less than 1% of the DC output voltage value.

Similarly, during the transition from doubler to non-doubler mode, the duty cycle of S may be decreased gradually from 100% to 0 within a duration of, e.g., 200 µs to 10 ms. After that, switch S remains off, and the rectifier operates in non-doubler mode. During the period that the duty cycle is changing, the closed-loop controller changes the switching frequency from 1 MHz to 600 kHz to regulate the output voltage. Again, with the two controllers in synergy, the voltage overshoot is reduced.

Duty Cycle Control Mode

In some embodiments, PWM control of the control switch S is used in steady state as well as in the transition between voltage doubler and non-voltage doubler modes. In such embodiments, the converter runs in a hybrid operation mode, also referred to as a duty cycle control mode. In this mode, within one switching period, the converter operates in voltage doubler mode for part of the switching period and operates in non-voltage doubler mode for the other part of the switching period. The switch S conducts for a period in each switching cycle, and the rectifier operates in partly non-doubler mode and partly doubler mode. In this way, the DC blocking capacitor voltage is neither zero nor Vo; rather, it is between. Then, the output voltage is between Vo and 2Vo, depending on the duty cycle of the doubler switch S.

Duty cycle control mode will be described with reference to an embodiment based on the circuit shown in FIG. 1, the parameters listed in Table 1, and a switching frequency fixed at 1 MHz. In this mode, the switching frequency remains fixed and the output voltage Vo is variable from V to 2V. The positive half cycle is defined as the positive transformer secondary side current ($I_{SEC}>0$). The negative half cycle is defined as the negative transformer secondary side current ($I_{SEC}<0$). In steady state, the output voltage Vo=10V in non-doubler mode, and Vo=20V in doubler mode.

To achieve doubler mode operation, S is turned on only during the negative half cycle of the transformer secondary side current, $I_{SEC}$, because S takes effect only during the negative half cycle, while operation in the positive half cycle is the same regardless of the state of S. In other words, the effective duty cycle is from 0 to 50% for the voltage doubler switch to have an impact on the output voltage. When the duty cycle is 0 (zero), the gate signal is always low for the voltage doubler switch S, or the rectifier operates in non-doubler mode, the voltage on the blocking capacitor is 0 and the output voltage Vo is equal to the transformer winding voltage, which is 10V in this example.

Figure 8:
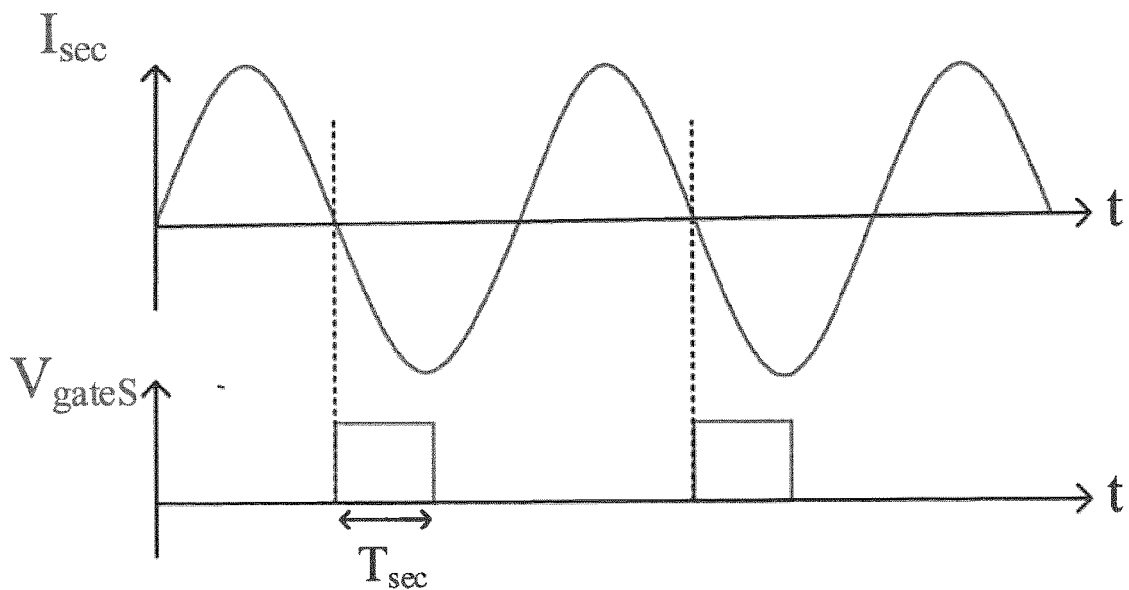
FIG. 8 is a timing diagram for a switch of a voltage doubler operating in duty cycle control mode, according to one embodiment.

FIG. 8 is a timing diagram, showing that the switch S is turned on when the transformer secondary side, $I_{SEC}$, becomes negative. The switch S is turned off after it conducts for a period of $T_{SEC}$. The duty cycle is defined as the ratio of the conduction time of the doubler switch, $T_{SEC}$, and the switching period, Ts.

$$D=T_{SEC}/TS \qquad (1)$$

Since the time period of the negative current is only half of the switching period, the duty cycle is varied from 0 (zero) to 0.5. When D=0, the circuit operates in non-voltage doubler mode and the output voltage is Vo. When D=0.5, the operation is voltage doubler mode and the output voltage will be 2Vo. When the duty cycle is between 0 and 0.5 (in an ideal case when the dead time is not considered), the output voltage is between Vo and 2Vo.

A simulation showed that when the switch S duty cycle is 20%, the capacitor voltage VCb is 7V with the S turned on for 200 ns (i.e., a duty cycle of 20%). The output voltage Vo is 17V. It was also observed that the power/current transferred during the positive half cycle is increased while the power/current is reduced during the negative half cycle, as compared to the case when the duty cycle is 0.

When the switch S duty cycle is 40%, the output voltage is almost 20V. In this example this is the maximum effective duty cycle, considering the theoretical max of 50% and a dead time of 10%. In other words, this is equivalent to the voltage doubler mode.

The switch S is turned on during the entire negative half cycle of the transformer secondary side current, $I_{SEC}$. The power during the entire negative half cycle is used to charge Cb. Thus, the capacitor voltage VCb is 10V in this case. The output voltage Vo is double VCb, i.e., 20V. Power is transferred to the load during the positive half cycle, while during the negative half cycle, no power is transferred to the load.

Figure 9:
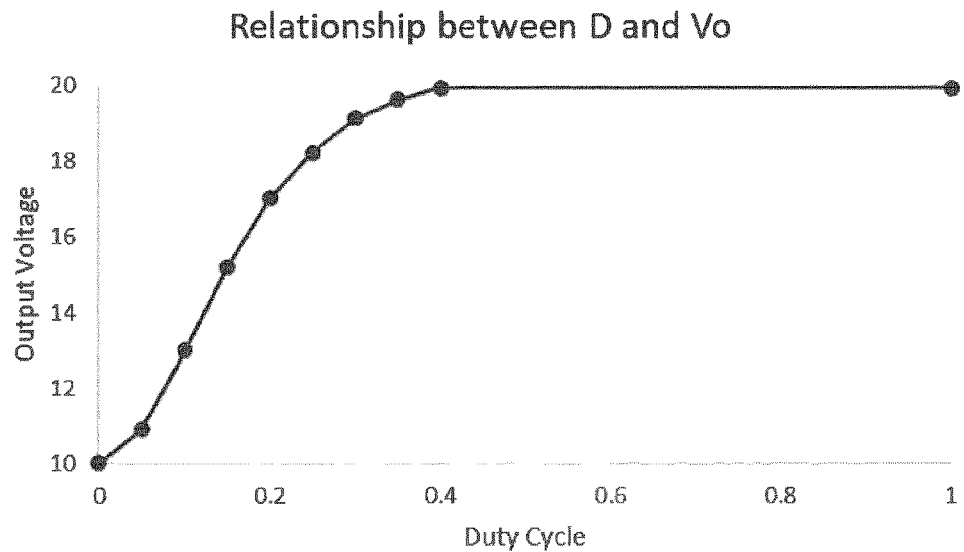
FIG. 9 is a plot showing a relationship between duty cycle and output voltage.

The relation between the duty cycle D of the switch S and the output voltage Vo is shown in FIG. 9, based on a simulation. As the D increases from 0 to 0.4 the output voltage increases from 10V to 20V. When the duty cycle is larger than 0.4, the output voltage is maintained at 20V. It is noted that the 0.4 duty cycle includes the impact of the dead time. In an extreme case, or in theory, the duty cycle should be 0.5 to achieve full voltage doubler operation. However, in a practical application, because of the dead time, the maximum duty cycle cannot achieve 0.5.

Therefore, by controlling the conduction time of the switch S within the switching period, the output voltage can be regulated at any value between Vo and 2Vo, such as from 10V to 20V in the above example. In this case, the switch S is turned on and off within every switching period of the resonant converter.

Sub-Frequency Control Mode

Figure 10:
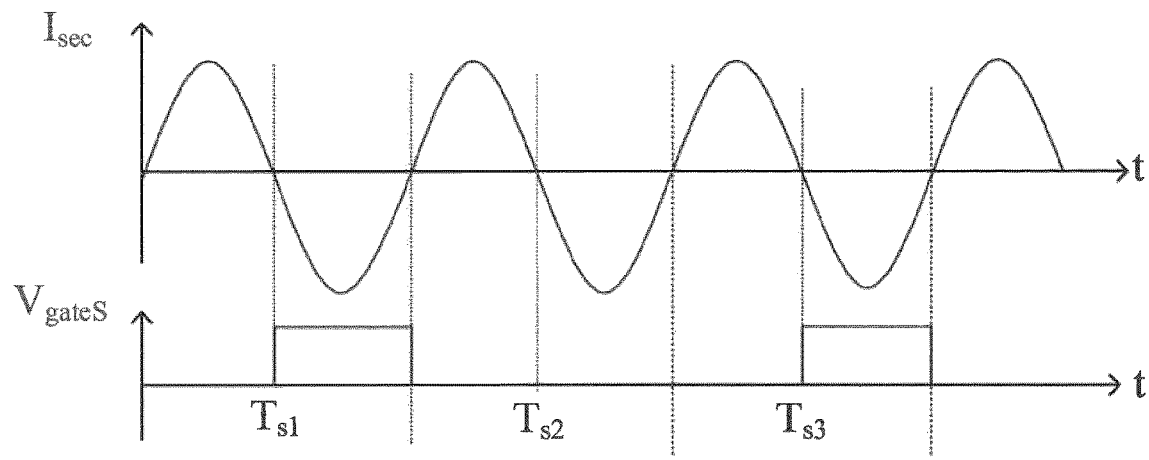
FIG. 10 is a timing diagram for a switch of a voltage doubler operating in sub-frequency control mode, according to one embodiment.

FIG. 10 is a timing diagram for switch S according to another embodiment, based on the circuit of FIG. 1. In this embodiment, the switch S is turned on for the complete negative current cycle in a first switching period, Ts1. Then the switch S is turned off for a next switching period, Ts2, and then S is turned on for a third switching period, Ts3. The operation continues this way. With this control mode, the circuit operates in voltage doubler mode for one switching period and in non-voltage doubler mode for the next switching period. Therefore, in steady state, the output voltage will be between Vo and 2Vo for given circuit parameters.

In another embodiment, the switch S may be controlled in the following way:
 (1) S is turned on for the complete negative current cycle for N switching periods continuously;
 (2) S is turned off for the following M switching cycles continuously;
 (3) The output voltage Vo will be between V and 2V, and will depend on the values of N and M. The values of N and M may be the same or different.
 (4) Since N and M are integers, the output voltage Vo cannot be regulated continuously. The voltage Vo will be regulated in discrete values according to N and M.
 (5) The switching frequency Fs or switching period Ts may be changed to achieve continuous output voltage regulation.

Advantages of this embodiment include the following:
The switching loss of S is reduced since the switching frequency of S is lower than the switching frequency of the resonant converter. In the example shown in FIG. 10, the switching frequency of S is half of the switching frequency of the resonant converter.
The switching frequency variation range of the resonant converter is smaller in order to regulate the output voltage between Vo and 2Vo.

Since the switching frequency of the doubler switch S is lower than the switching frequency of the resonant converter, this control mode is referred to as sub-frequency control mode.

II. Primary Side Control Switch

According to a second aspect of the invention, variable output of an AC-DC resonant converter is achieved by implementing control of the resonant converter primary side, using a primary side control switch.

This aspect is achieved by implementing a capacitor bypassing circuit in the primary side of a series resonant converter. Embodiments solve the wide voltage range problems discussed above, by accommodating wide AC input voltages (e.g., 110-240 VAC) and providing wide DC output voltage ranges (e.g., 5-20 VDC). For wide AC input voltage, embodiments may include two resonant capacitors used respectively for two AC line voltages—e.g., 110-120 VAC, and 220-240 VAC. For wide output voltage, embodiments may use the two capacitors respectively for different output voltages. Embodiments may require an additional capacitor and switch, which add only a small increase in circuit footprint and cost, and only a small resonant inductor.

Figure 11:
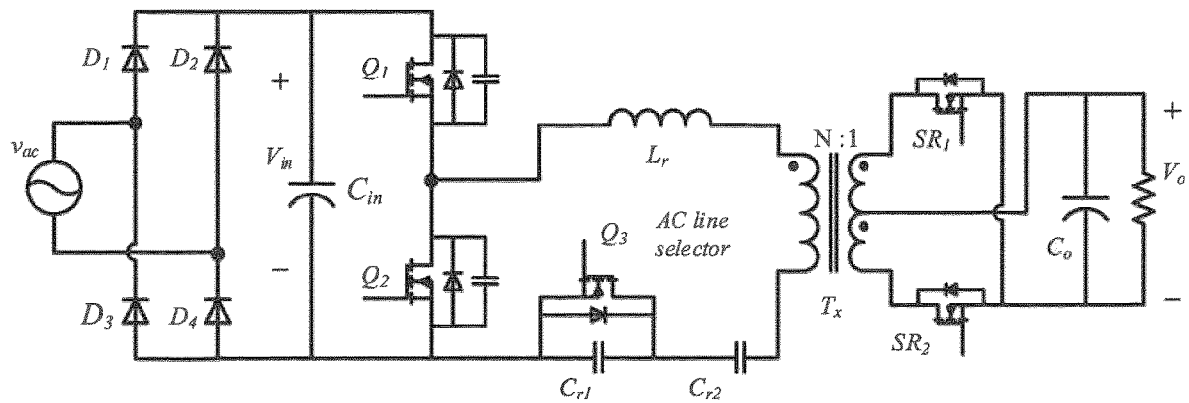
FIG. 11 is a schematic diagram of a series resonant converter (SRC) with capacitor bypassing, according to one embodiment.

An embodiment based on a series resonant converter (SRC) topology is shown in FIG. 11. The circuit includes a primary side rectifier stage, which may be a full bridge rectifier (D1-D4) and a bulk capacitor Cin as shown in FIG. 11, half bridge (HB) switches Q1 and Q2, and a series resonant tank circuit including a resonant inductor Lr, two resonant capacitors Cr1 and Cr2, and a control switch Q3. The secondary side includes a rectifier stage, for which a non-limiting example is a center-tapped configuration with synchronous rectifiers, as shown in FIG. 11. Other secondary side configurations, such as full bridge rectifiers, voltage doubler rectifiers, etc., may also be used.

In a conventional SRC, it is challenging to design the converter to use both 110-120 VAC and 220-240 VAC input line voltages, since the resonant inductor Lr value must be very large to achieve reasonable regulation performance over the large input voltage range. Embodiments described herein overcome this problem by providing what are effectively two SRC resonant tank circuits, one for each of the AC input voltages. According to the embodiment shown in FIG. 11, the switch Q3 operates in on/off mode to select the proper resonant capacitor(s) (Cr1 and/or Cr2) for the different AC voltages.

Table 3 shows design parameters of an embodiment for 100-240 VAC input, 10 VDC, 30 W output. With 47 μF capacitor as Cin and 30 W output power, the DC voltage (Vin) on Cin is 100-340 VDC for 100-240 VAC input. More specifically, Vin is 100-200 VDC for 120 VAC line voltage, and Vin is 250-340 VDC for 220 VAC line voltage.

TABLE 3

Design Parameters of SRC with Capacitor Bypassing

| | |
|---|---|
| Input AC voltage | 100 VAC-240 VAC |
| Input capacitor Cin | 47 μF/450 V |
| Input capacitor voltage Vin | 100 VDC-340 VDC |
| Switching frequency range | 500 kHz-1 MHz |
| Output voltage/power | 10 V/30 W |
| Resonant inductor Lr | 40 μH |
| Resonant capacitor Cr1 | 3.3 nF |
| Resonant capacitor Cr2 | 40 nF |
| Transformer turns ratio Ntx | 10:2:2 |
| HB MOSFETs | IPD65R400CE |
| SR MOSFETs | BSC034N03LSG |
| Control MOSFET Q3 | BSC320N20NS3G |

Figure 12:
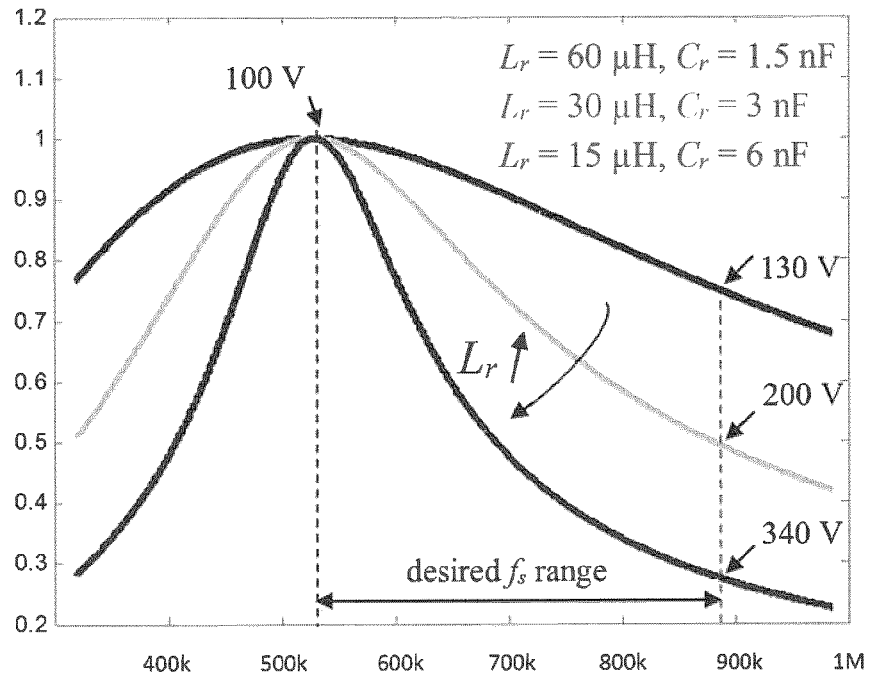
FIG. 12 is an SRC gain curve for different values of resonant inductor and capacitor within a range of switching frequency.

It is noted that in a conventional SRC converter with 30 W output power, to accommodate Vin of 100-340 VDC, a resonant inductor Lr of 60 μH must be used, if the desired switching frequency range is 500-900 kHz. The gain curve is shown in FIG. 12. With a smaller Lr, it either cannot cover the entire input voltage range, or requires a substantial increase in the switching frequency range, which makes such a design difficult to achieve in a practical application.

However, according to embodiments with capacitor bypassing as described herein, a small resonant capacitor is used for 120 VAC line, and a large resonant capacitor is used for 220 VAC line. In the embodiment of FIG. 11 and the parameters in Table 3, at 120 VAC, the MOSFET $Q_3$ remains off, and the equivalent $C_r$ value is $C_{r1}*C_{r2}/(C_{r1}+C_{r2})$, which is about 3 nF in this example. This set of parameters covers the 120 VAC line with a DC range of 100-200 VDC.

When the input AC voltage is changed to 220 VAC, the MOSFET $Q_3$ is turned on. Thus, $C_{r1}$ is a short circuit, and $C_{r2}$ individually serves as the resonant capacitor. As $C_{r2}$ is a larger value, 40 nF in this example, the resonant frequency is reduced as compared to the 120 VAC case. Therefore, the voltage gain is also reduced within the desired frequency range. The DC voltage range is 250-340 VDC.

Figure 13:
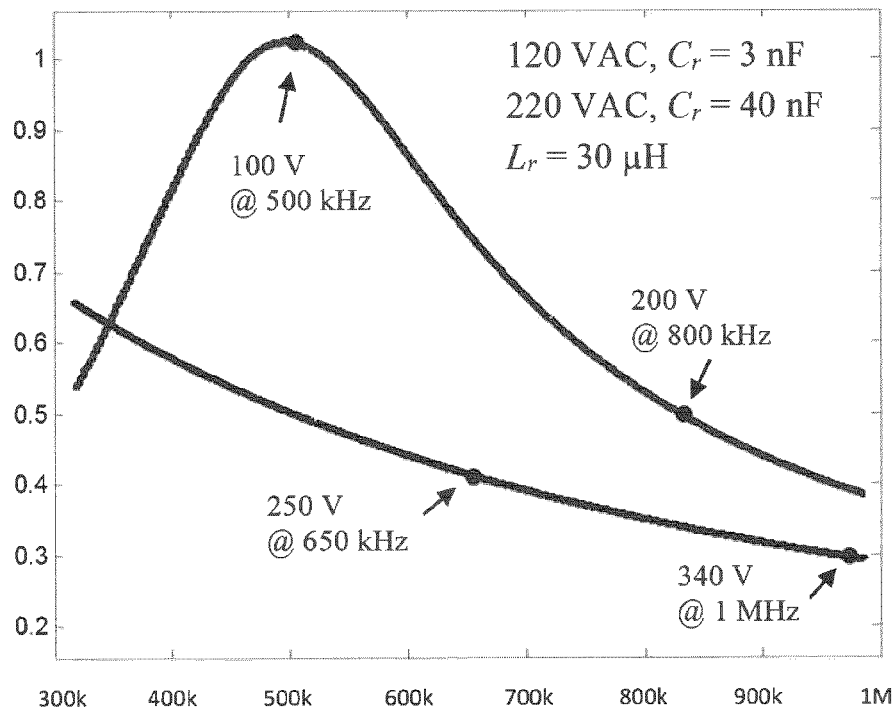
FIG. 13 is an SRC gain curve for different values of input AC voltage and resonant capacitor, within a range of switching frequency.

FIG. 13 shows the gain curves for the SRC with capacitor bypassing for the two AC lines, for an embodiment based on the parameters from Table 1. The equivalent $C_r$ value is 3 nF for 120 VAC and 40 nF for 220 VAC. The actual inductor value needed is 30 μH, which is only half of the 60 μH inductor in the conventional SRC converter. If the two inductors are designed with the same core and same winding, the flux in the 60 µH inductor will be 2 times the 30 µH counterpart, due to Φ=LI, making the core loss more than 4 times higher. If the core loss is maintained the same for the two inductors, then the copper loss of the 60 µH inductor will be 4 times higher, because the winding needs to be twice the length with half section area.

Change of Circuit Behavior Due to Body Diode of the Control Switch

Referring to the embodiment of FIG. 11, when the converter is operating with 220 VAC line, the switch $Q_3$ is turned on. Thus, all the parasitic components of $Q_3$ are ineffective.

When the converter is operating at 120 VAC line, $Q_3$ is turned off, and the impact of the parasitic components should be considered. The parasitic capacitor is directly parallel to $C_{r1}$, thus, its effect is small and can be neglected. The body diode, however, influences the circuit behavior, because the body diode changes the charging and discharging characteristics of a capacitor that is in parallel with it.

Figure 14:
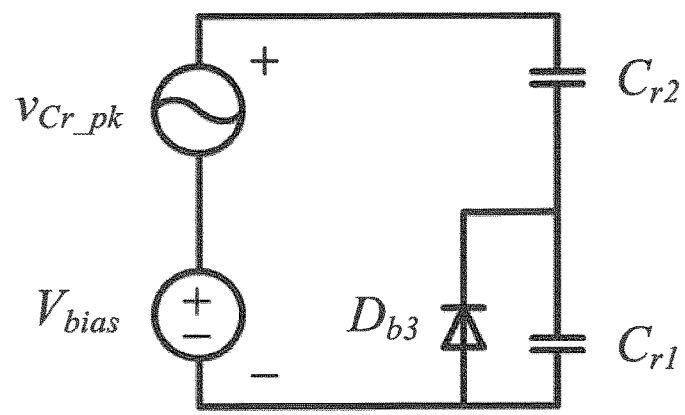
FIG. 14 is a schematic diagram of an equivalent circuit of a resonant capacitor and body diode.

Whether the body diode conducts or not, the resonant current is of an AC shape alternating at the switching frequency. Thus, a sinusoidal current may be used for the analysis. The voltage across $C_{r1}$ and $C_{r2}$ is also be sinusoidal, and for half bridge, the capacitor should bear a DC bias, $V_{bias}$, with a value equal to half of the input DC voltage. Thus, a simplified model of $C_{r1}$ and $C_{r2}$ voltage stress at 120 VAC is shown in FIG. 14. In this model, the AC voltage source $v_{Cr\_pk}$ is defined by the peak value of the AC component on the two resonant capacitors. $D_{b3}$ is the body diode of the control switch $Q_3$.

Depending on whether $D_{b3}$ conducts, two conditions should be considered. The boundary of the two conditions is $V_{bias}=v_{Cr\_pk}$.

Condition A: $V_{bias} \geq v_{Cr\_pk}$

If the resonant current is low, then the AC component will always be lower than the DC bias, i.e. $V_{bias} \geq V_{Cr\_pk}$. The total voltage stress on the two resonant capacitors is always positive. Thus, the diode $D_{b3}$ is always reverse biased. Equivalently, $D_{b3}$ could be removed. The voltage stress of $C_{r1}$ and $C_{r2}$ is reversely proportional to the capacitor value.

Figure 15:
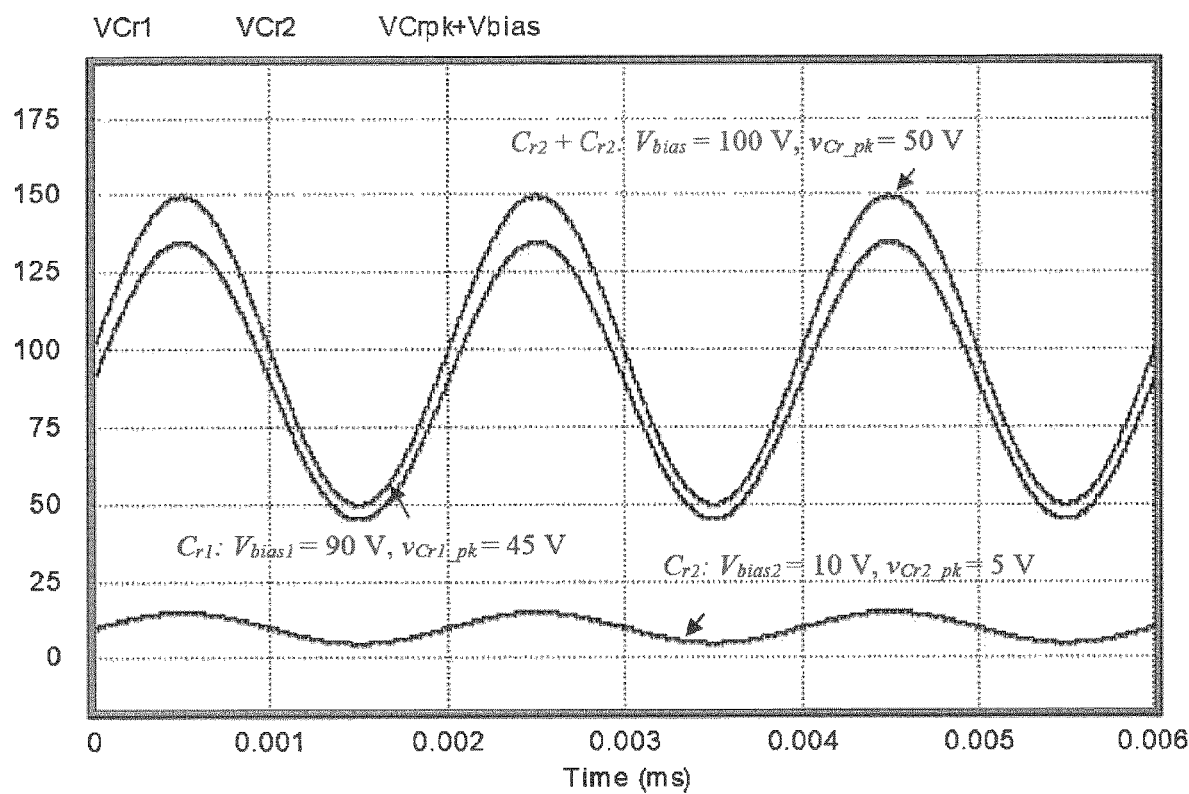
FIGS. 15, 16, and 17 are plots showing voltage stress on resonant capacitors of the embodiment of FIG. 11, under various conditions.

FIG. 15 shows the PSIM simulation result of an example of condition A, in which the total bias voltage $V_{bias}=100$ V, and the AC component $v_{Cr\_pk}=50$ V for $C_{r1}=4$ nF and $C_{r2=36}$ nF. As the capacitance ratio of $C_{r1}$ and $C_{r2}$ is 1:9, the impedance will be 9:1. Based on the voltage divider theory, $C_{r1}$ should assume 90% of the total voltage stress—both the DC and AC components, and $C_{r2}$ should assume 10%. Thus, for $C_{r1}$, the bias voltage $V_{bias1}=90$ V, and the AC component $v_{Cr1\_pk}=45$ V. For $C_{r2}$, the bias voltage $V_{bias2}=10$ V, and the AC component $v_{Cr2\_pk}=5$ V.

Condition B: $V_{bias} < v_{Cr\_pk}$

Figure 16:
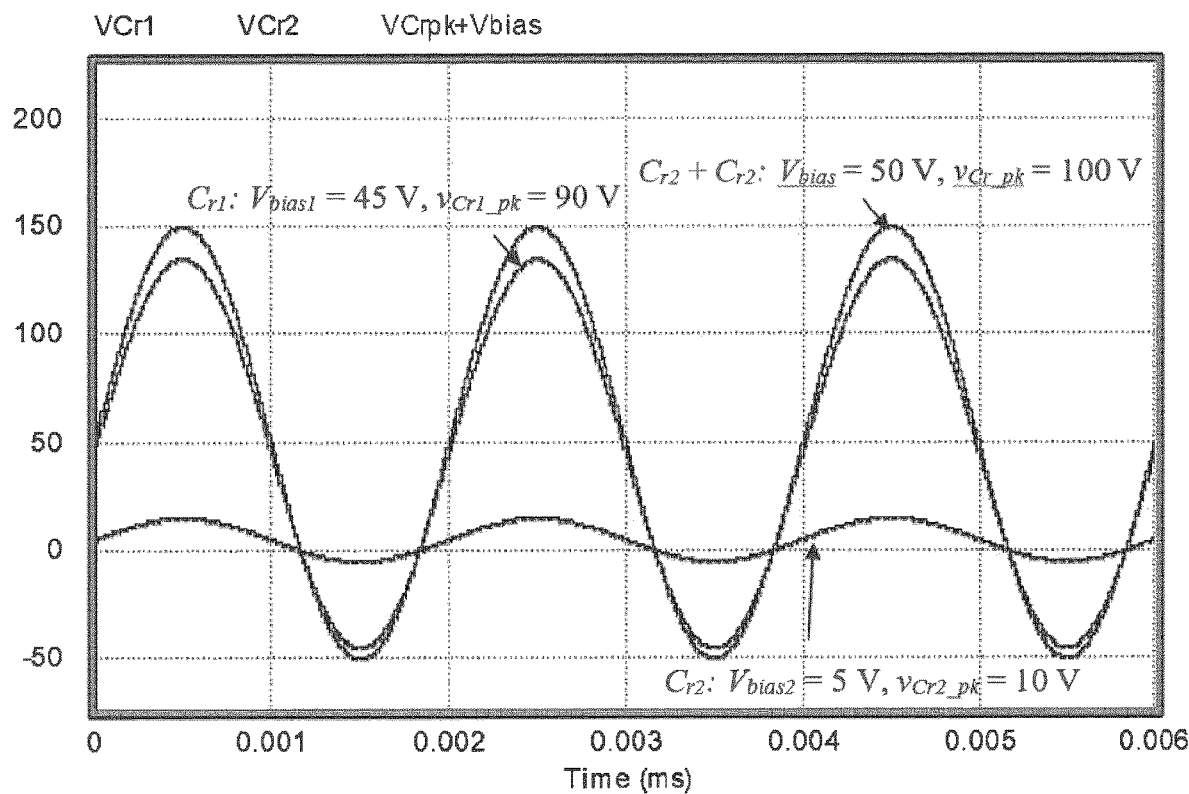

In the condition that $V_{bias} < V_{Cr\_pk}$, the minimum voltage stress on the two capacitors $C_{r1}$ and $C_{r2}$ is negative. If no body diode is presented, the voltage distribution on the two capacitors will still be determined by the capacitor value in a reversely-proportional manner, despite the direction. FIG. 16 shows the voltage waveforms of the two resonant capacitors without the body diode, for $V_{bias} < v_{Cr\_pk}$.

Figure 17:
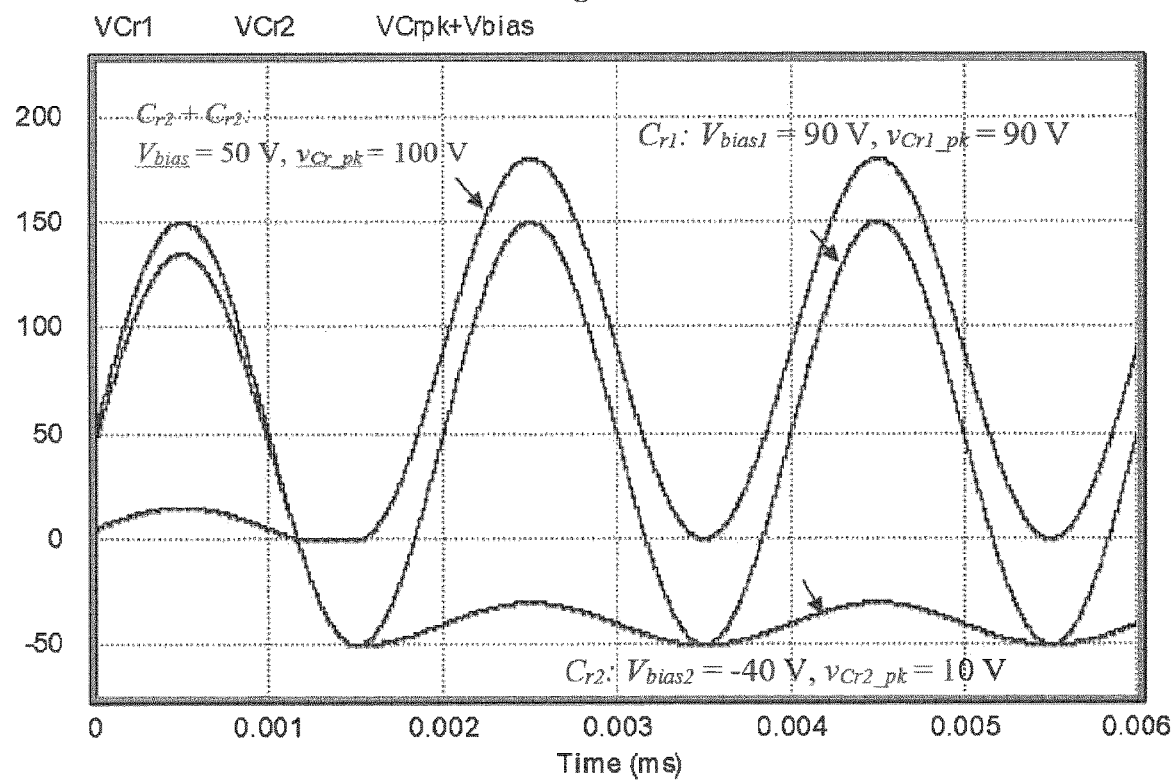

When the body diode is added in parallel with $C_{r1}$, $C_{r1}$, the voltage is always clamped as positive. As can be observed in FIG. 17, at t=0, the two capacitors store no energy. Thus, in the first cycle when the total voltage is above zero, the two capacitors voltage stress is reversely-proportionally distributed, despite being charged or discharged.

As the total voltage decreases to negative, $D_{b3}$ will conduct. Thus, the voltage across $C_{r1}$ is clamped to zero. As the voltage is decreasing, the capacitors are discharging, and $C_{r2}$ bears all the negative voltage. Until the total voltage stress reaches the minimum, the two capacitors start to charge again. During the charging process, $D_{b3}$ remains reverse biased, and the charging current must go through the series connected $C_{r1}$ and $C_{r2}$ simultaneously. Thus, the voltage variation on $C_{r1}$ and $C_{r2}$ is maintained reversely-proportional to the capacitor value. As the starting point is zero for $C_{r1}$ voltage, after a symmetrical cycle of charging and discharging, the voltage at the ending point is still zero for $C_{r1}$. Once the steady state is reached, the body diode $D_{b3}$ does not conduct again. Thus, with the body diode, the AC voltage stress for $C_{r1}$ and $C_{r2}$ is still reversely proportional to the capacitor value, while the DC bias is changed to maintain minimum voltage on $C_{r1}$ as zero. As the currents in the two resonant capacitors are the same in steady state, it is concluded that the body diode only changes the DC bias.

In summary, the body diode has no impact on the circuit behavior when the resonant current/load current is low, i.e., the AC voltage stress is lower than the DC bias ($V_{bias} \geq v_{Cr\_pk}$). Otherwise, the body diode will conduct for a short period during the transient and clamp the voltage on $C_{r1}$ always as critical positive. The DC bias on the two resonant capacitors will then be re-distributed, and the AC component remain unchanged. This does not have an impact on the resonant current/load current.

ALTERNATIVE EMBODIMENTS

The following alternative topologies have the same operating principle as that of the SRC with resonant capacitor bypassing described above.

Two Capacitors in Parallel

Figure 18:
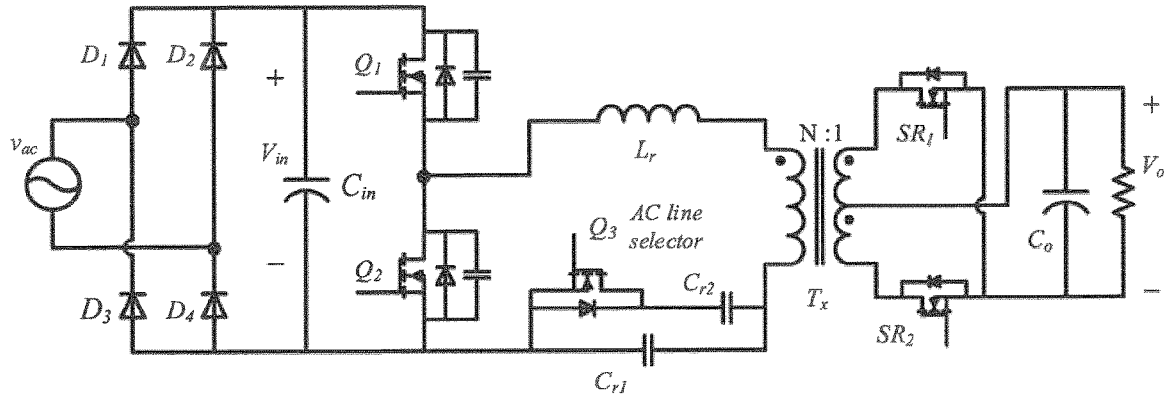
FIG. 18 is a schematic diagram of a series resonant converter with capacitor bypassing, according to another embodiment.

As shown in FIG. 18, $C_{r1}$ and $C_{r2}$ may be connected in parallel instead of in series as in the embodiment of FIG. 1. $Q_3$ is connected in series with $C_{r2}$ and used as an AC line selector for selecting between 120 VAC and 240 VAC lines.

For 120 VAC, $Q_3$ is turned off, and only $C_{r1}$ serves as the resonant capacitor, which is a small value. For a 240 VAC line, $Q_3$ is turned on, so that $C_{r1}$ and $C_{r2}$ are connected in parallel, and the total resonant capacitor value is $C_{r1}+C_{r2}$. The body diode will also change the DC bias of $C_{r1}$ and $C_{r2}$ during the transient. In steady state, the impact is small and may be neglected.

As compared to the series connected embodiment of FIG. 1, for the same effective resonant capacitor design, the peak voltage stress on $Q_3$ is slightly higher at 120 VAC when it is turned off. This is because, for the parallel structure, $Q_3$ withstands the total voltage stress, whereas for the two capacitors connected in series, $Q_3$ withstands a part of the total stress.

SRC with Inductor Bypassing

Figure 19:
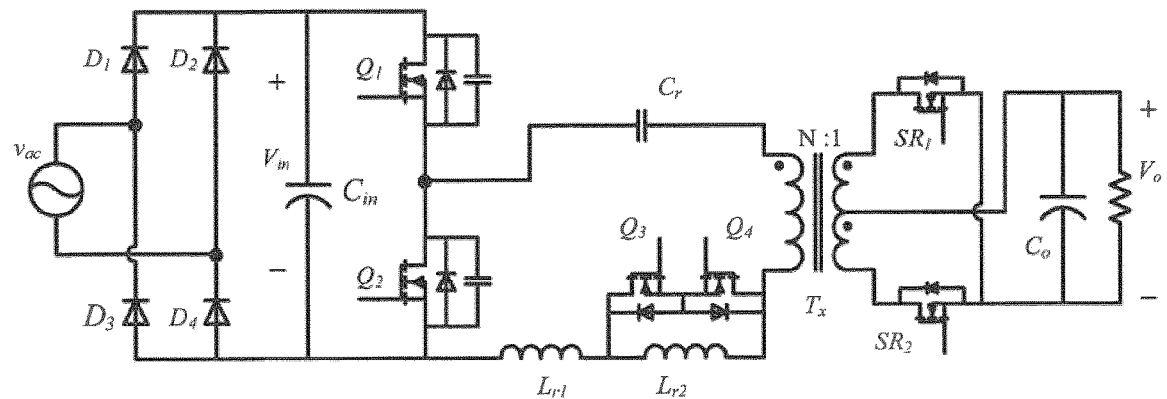
FIGS. 19 and 20 are schematic diagrams of a series resonant converter with inductor bypassing, according to further embodiments.

FIG. 19 shows an embodiment based on an SRC, with two resonant inductors connected in series and the control switch implemented with switches $Q_3$ and $Q_4$ in back-to-back configuration such that they operate together with one control signal, i.e., they are turned on and off simultaneously and may be considered to operate as a single switch. For 120 VAC, $L_{r1}$ is used as the resonant inductor. For 240 VAC, $L_{r1}$ and $L_{r2}$ are connected in series and serve as the resonant inductor, with a value of $L_{r1}+L_{r2}$. The control switch $Q_3$ and $Q_4$ is used to switch between the two AC lines. Otherwise, the inductor will have DC bias current, which is not acceptable. In practice, $L_{r1}$ may be the leakage inductor from the transformer, while $L_{r2}$ is a discrete inductor.

Figure 20:
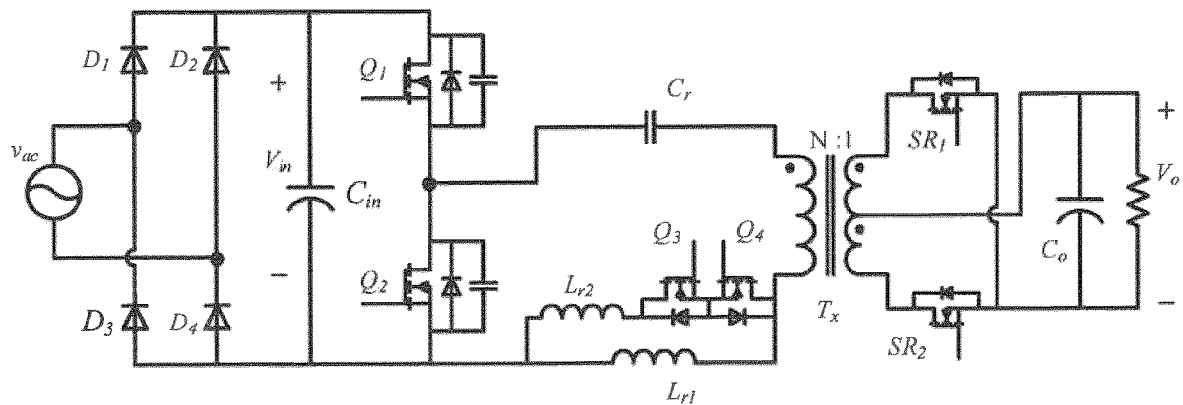

In another embodiment, the two inductors may be connected in parallel, as shown in FIG. 20, wherein the AC line selector control switch ($Q_3$ and $Q_4$ in back-to-back configuration) is in series with $L_{r2}$. At 120 VAC, $Q_3$ and $Q_4$ are turned off. The total inductor value is $L_{r1}*L_{r2}$ ($L_{r1}+L_{r2}$). For 240 VAC, $Q_3$ and $Q_4$ are turned on. Thus, $L_{r2}$ is a short circuit and $L_{r1}$ alone serves as the resonant inductor. In this embodiment, the two inductors discrete. Although two inductors in parallel may not be a practical solution, it is technically viable.

Comparison of Capacitor Bypassing and Inductor Bypassing

According to the capacitor bypassing and inductor bypassing embodiments described herein, a different resonant tank circuit is used for each of the 120 VAC and 220 VAC line voltages. The embodiments use a small resonant capacitor/inductor value for 120 VAC, and a larger value for 220 VAC, such that the resonant frequency for 220 VAC is lower than the 120 VAC case. Then, the voltage gain may be reduced for 220 VAC. In further embodiments, capacitor bypassing and inductor bypassing may be combined to provide wider voltage variation ranges.

Figure 21:
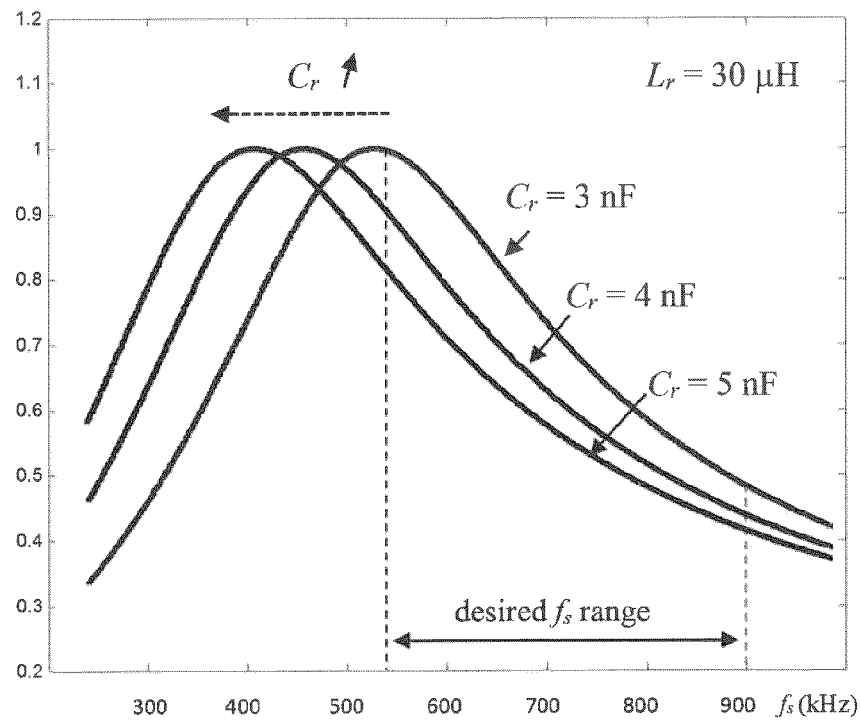
FIGS. 21 and 22 are SRC gain curves for different values resonant capacitor and resonant inductor, respectively, within a range of switching frequency.
Figure 22:
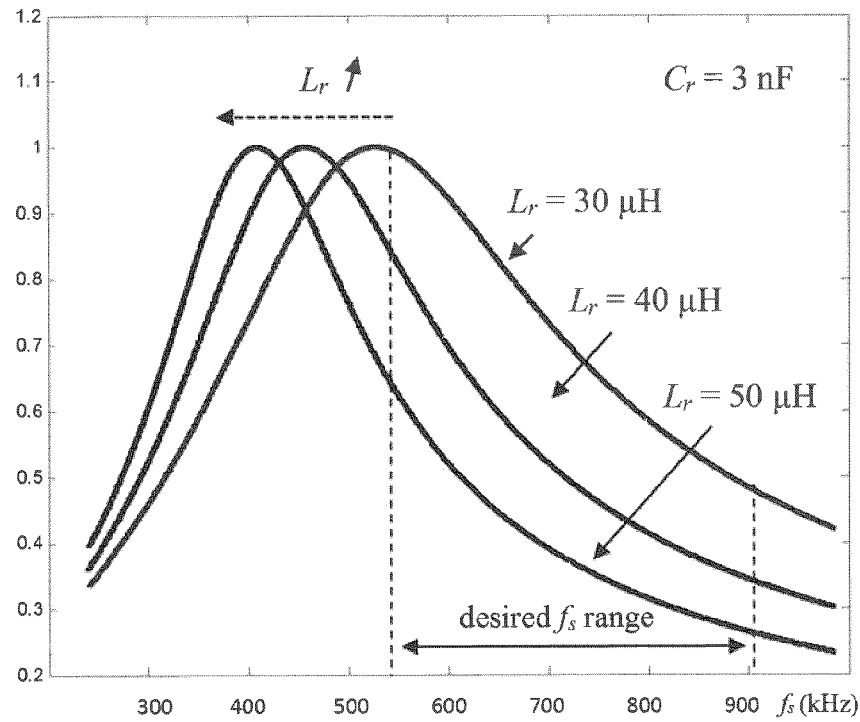

In terms of effectiveness, inductor bypassing is more effective than capacitor bypassing, in that only a small add-on value is needed to achieve enough gain dip for 220 VAC. Gain curves of an SRC converter with different values of capacitors and inductors are shown in FIGS. 21 and 22, respectively. The values of $L_r$=30 μH and $C_r$=3 nF are used as the reference. In FIG. 21, the capacitors are increased to 4 nF and 5 nF. At 900 kHz, the minimum voltage gain with 4 nF is 0.43, and that of 5 nF is 0.41. As a comparison, in FIG. 22, by changing the inductors to 40 μH and 50 μH, the voltage gain is lower in the desired frequency range. At 900 kHz, the minimum voltage gain with 40 μH is 0.34, and that of 50 μH is 0.25.

The reason that inductors have more significant impact than capacitors in reducing the voltage gain is that the SRC converter is operated in the inductive region, i.e., higher than resonant frequency. If operating in the capacitive region, i.e., lower than resonant frequency, it would be observed that changing the capacitor value would have more impact on the gain.

From the point view of size, cost reduction, and simplicity, the capacitor bypassing method is a better choice. For example:

(1) Only one switch is needed for capacitor bypassing, while two switches are used for inductor bypassing (with only one control signal), although both may be of low voltage rating.
(2) The switch used in capacitor bypassing is ground referenced, thus the driver design is much simpler than that in inductor bypassing.
(3) In practice, the resonant capacitors used in the converters are much smaller in physical size than the resonant inductors. Thus, for a compact size, capacitor bypassing should be selected.

Sub-Frequency Control Mode

Figure 23:
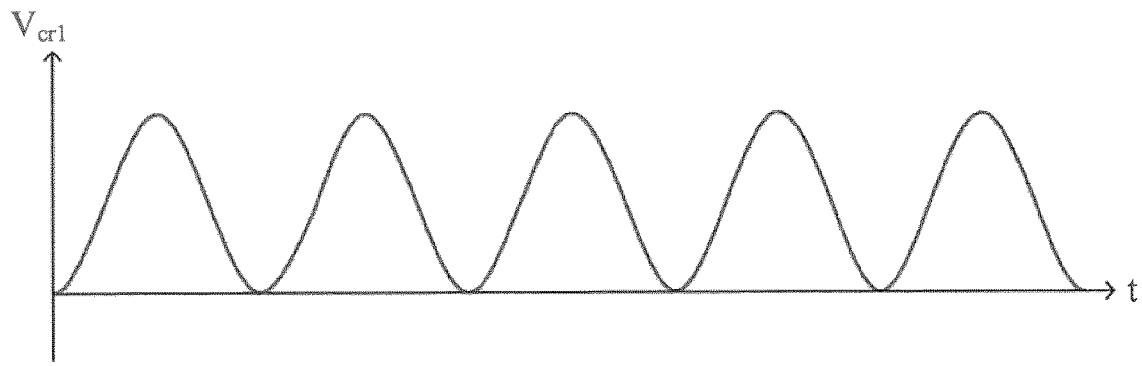
FIG. 23 is a plot showing the voltage waveform on a resonant capacitor of the embodiment of FIG. 11, according to an operating mode when the by-passing switch is off.

In the above capacitor bypassing embodiments, the control switch Q3 is operated either on or off for a long period of time, or under steady state operation. When Q3 is on in steady state, the voltage across Cr1 is zero. When Q3 is off in steady state, the voltage across Cr1 is shown in FIG. 23. It is noted that the voltage $V_{CR1}$ is the same as the drain to source voltage of Q3.

Figure 24:
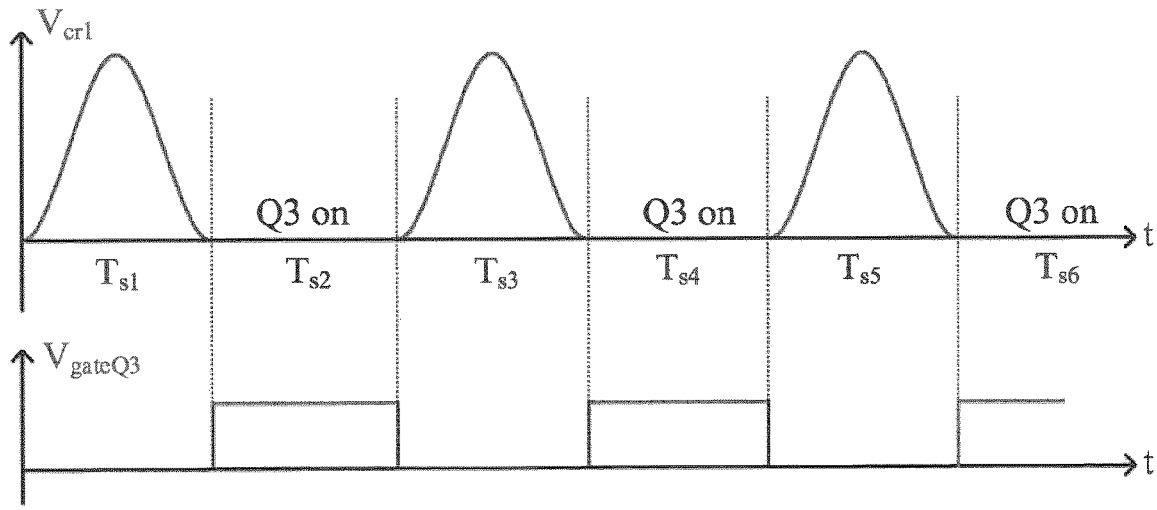
FIG. 24 is a timing diagram for the embodiment of FIG. 11, under a sub-frequency operating mode.

FIG. 24 shows the control signal of Q3 under sub-frequency control mode. According to this embodiment, for a first switching period, Ts1, Q3 is off. For a second switching period, Ts2, Q3 is turned on. For a third switching period, Q3 is turned off again. The sequence repeats this way. Thus, Q3 is turned on for a complete switching period in alternative switching periods. Therefore, under this control mode, the output voltage will be a value between K*Vo and Vo, where K is a number between 0 and 1. The value of K depends on the parameters of the power circuit.

A more general control case is that Q3 will be off for X switching periods and will be turned on for Y switching periods, where X and Y may be the same or different. In this condition, the output voltage will be between K*Vo and Vo, where K is between 0 and 1.

Working Example

A 100-240 VAC input, 10 V, 30 W output prototype was built to demonstrate the effectiveness of an SRC with capacitor bypassing. The prototype was built according to FIG. 11 using the design parameters given in Table 3.

With 120 VAC, 60 Hz input the voltage on the input capacitor $C_{in}$ varies from 140 V to 170 V. For this input voltage the control switch Q3 was turned off, and the effective resonant capacitor value was 3 nF. The resonant inductor current had a peak value of 1 A, and the measured RMS value was 0.7 A. The output voltage was well regulated at 10 VDC.

The switching frequency for the rectified DC input voltage within 140 V and 170 V, were 650 kHz and 725 kHz, respectively, which was also the switching frequency range for 120 VAC operation. As the switching frequency increased, the resonant current had similar magnitude because of the same load current. In addition, the capacitor bypass circuit did not impact the zero voltage switching (ZVS) feature of the series resonant converter. Over the entire input voltage range, ZVS operation of the primary switches was maintained.

With 220 VAC, 50 Hz input, Q3 was turned on, and the effective resonant capacitor was 40 nF. The rectified DC input voltage was within 290 V to 315 V. Again, the output voltage was well regulated at 10 VDC. The resonant inductor current had a peak value of 1.1 A, and the measured RMS value was 0.8 A throughout the input voltage range.

The switching frequency for 290 V was 740 kHz, and for 315 V was 815 kHz. As the resonant capacitor was significantly larger, the resonant period was also much longer. Thus, the resonant current was more triangular in shape rather than sinusoidal. Similar to the 120 VAC case, the resonant current did not change significantly at different input voltages, as it is determined by the load. In addition, over the entire input voltage range, ZVS operation of the primary switches was maintained. The switching frequency variation range for the entire input voltage range (110V/220V) was 650-815 kHz.

Figure 25A:
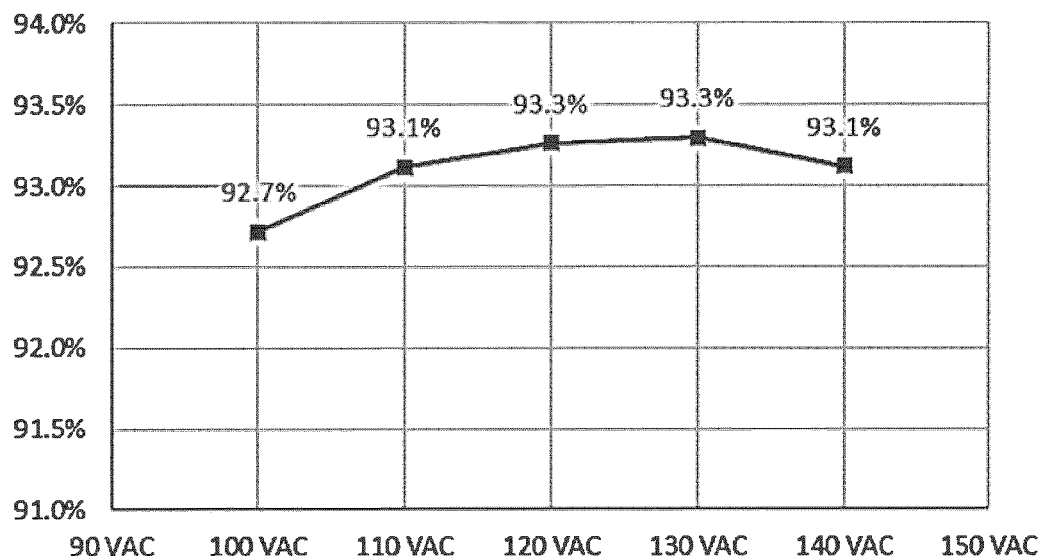
FIGS. 25A and 25B are plots show efficiency of the embodiment of FIG. 11, for different AC input voltages.

FIG. 25A shows the efficiency for different AC voltages for a 120 VAC line. At lower voltage, the rectifier current is high, so the loss is higher. At higher voltage, the resonant tank current has higher current stress, so the conduction loss and core loss increases. The peak efficiency at 93.3% is achieved around the nominal 120 VAC and 130 VAC, which is desired.

Figure 25B:
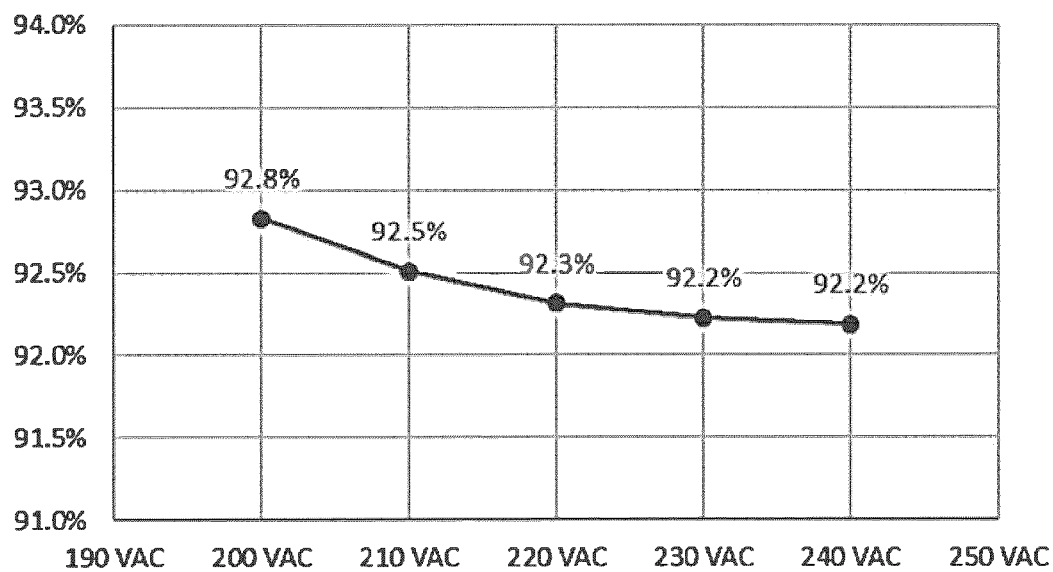

FIG. 25B shows the efficiency for different AC voltages for a 220 VAC line. The measured efficiency decreases as the AC voltage increases. This can be attributed to the increasing switching frequency, which results in higher conduction loss and core loss in the magnetic components as well as higher switching loss in the switching devices.

Capacitor Bypassing for LLC Converter and Wide Output Voltage Regulation

Figure 26:
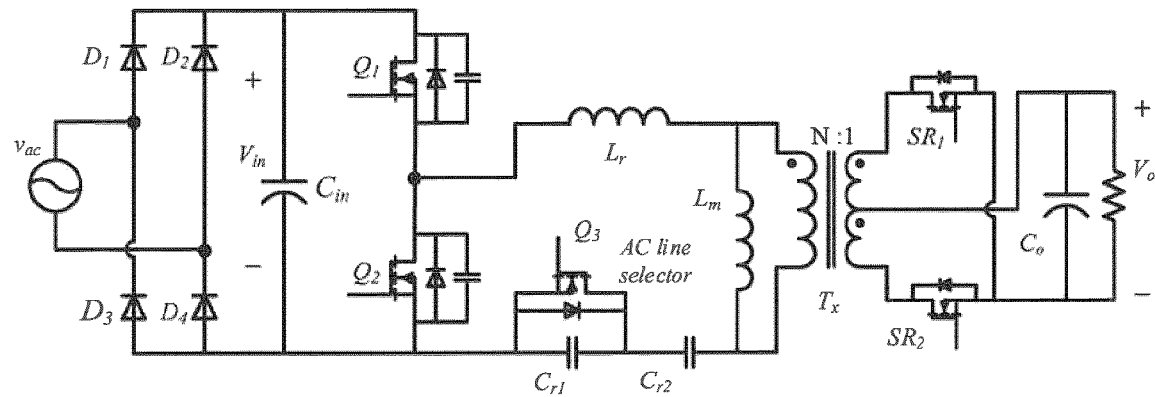
FIG. 26 is a schematic diagram of an LLC resonant converter with capacitor bypassing, according to one embodiment.

Capacitor bypassing as described herein may also be used for an LLC converter, to regulate a wide output voltage range. The following example applies to an LLC converter in, e.g., a USB power delivery application. The circuit diagram is shown in FIG. 26, and circuit parameters are given in Table 4, according to one embodiment.

The DC output voltage Vo has two levels, 5 V and 10 V with same output current of 3 A. When Vo is 10 V, a small resonant capacitor Cr1 of 1 nF is used, and the converter operates in below the resonance region. For 5 V output, a larger capacitor Cr2 of 20 nF is used, and the converter operates above the resonance region.

TABLE 4

Design Parameters for an LLC Converter with Capacitor Bypassing

| | |
|---|---|
| Input capacitor voltage Vin | 200 V DC |
| Output voltage 1/current | 10 V/3 A |
| Output voltage 2/current | 5 V/3 A |
| Resonant inductor Lr | 20 μH |
| Magnetizing inductor Lm | 60 μH |
| Resonant capacitors Cr1 | 1 nF |
| Resonant capacitors Cr2 | 20 nF |
| Resonant frequency with Cr1 | 1100 kHz |
| Resonant frequency with Cr1 | 250 kHz |
| Transformer turns ratio Ntx | 24:2:2 |

When the input voltage is 200 V and the output is 10 V, 3 A, the series connection of resonant capacitors Cr1 and Cr2 is used (Q3 is off), resonant capacitance value is 1 nF, and the resonant frequency of the resonant tank is 1100 kHz. The actual operating frequency is 900 kHz. Thus, the converter is operating in the below resonance region.

When input voltage is 200 V and the output is at 5 V/3 A, only the resonant capacitor Cr2 of 20 nF is used (Q3 is on), and the resonant frequency of the resonant tank becomes 250 kHz. The actual operating frequency is 850 kHz. Thus, the converter is operating above the resonance region. A reduced voltage gain is achieved, with similar switching frequency as the 10 V case.

Full Bridge Rectifier at Transformer Secondary Side

Figure 27:
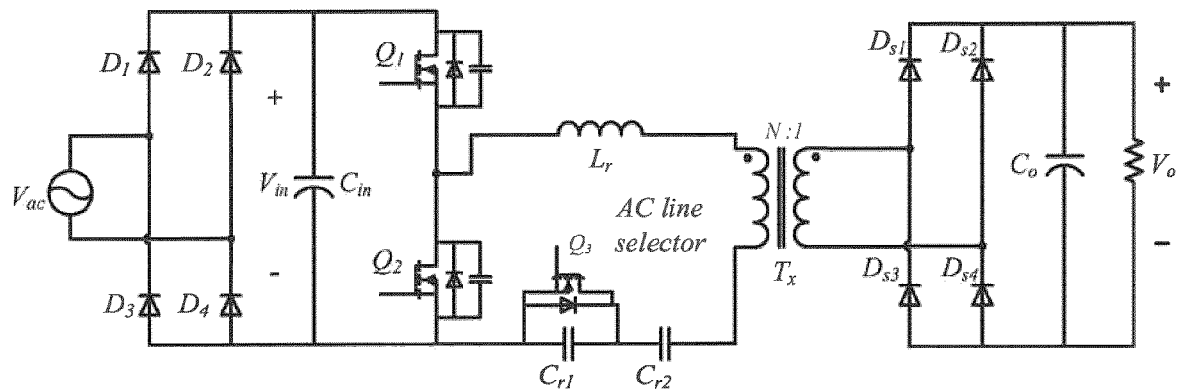
FIG. 27 is a schematic diagram of a series resonant converter with capacitor bypassing, according to another embodiment.

FIG. 27 shows an alternative SRC embodiment with capacitor bypassing, implemented with a full bridge rectifier using one secondary winding and four diodes.

Figure 28:
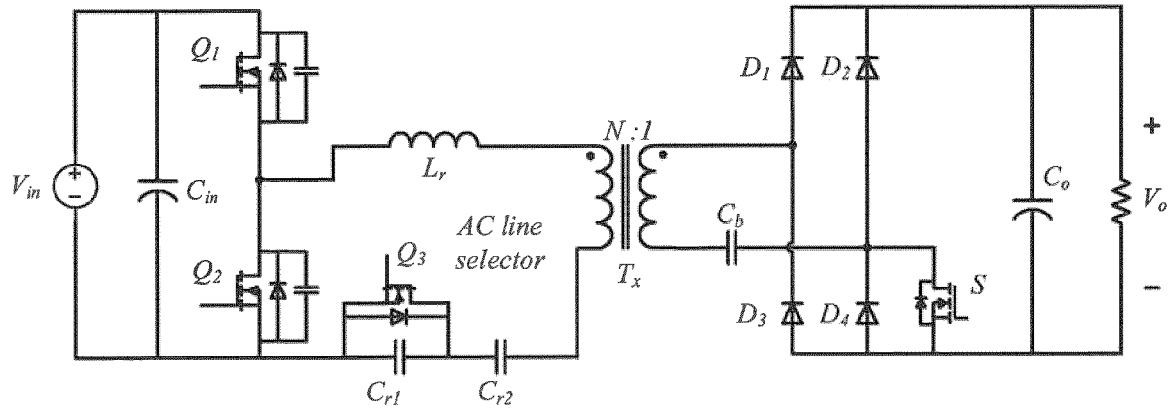
FIG. 28 is a schematic diagram of a series resonant converter with capacitor bypassing and a secondary side voltage doubler, according to one embodiment.

Combined Circuit with Primary Side Capacitor Bypassing and Secondary Side Voltage Doubler In the above aspects and embodiments, resonant converters with primary side capacitor bypassing switch and resonant converters with secondary side voltage doubler switch were described. Since the operation of the two switches (primary and secondary sides) are independent, the two approaches may be combined in the same resonant converter, as shown in FIG. 28. Table 5 shows combinations of control methods that may be used in this embodiment. It is assumed that for a given switching frequency Fs and given set of circuit parameters of the resonant circuit, the output voltage is Vo.

TABLE 5

Non-Switching Operation

| Switch | Case 11 | Case 12 | Case 13 | Case 14 | Note |
|---|---|---|---|---|---|
| Q3 | on | off | on | off | non-switching |
| S | off | off | on | on | non-switching |
| Vo | Vo11 = K*V | Vo12 = V | Vo13 = 2K*V | Vo14 = 2 V | |

When both Q3 and S are off, case 12, the circuit will operate with no capacitor bypassing and no voltage doubler. The output voltage will be Vo. When Q3 is on (capacitor bypassing is activated) and S is off (non-voltage doubler operation), case 11, the output voltage is Vo11=K*Vo. The value K is between 0 (zero) and 1 (one). The value of K depends on the parameters of the power circuit. When both Q3 and S are on (both capacitor by-passing active and voltage doubler active), case 13, the output voltage is Vo13=2K*Vo. When Q3 is off (no capacitor by passing) and S is on (voltage doubler active), the output voltage is Vo14=2Vo.

Under each operating condition (case 11 to case 14), the output voltage may be regulated using switching frequency control. For example, if K=0.75, then by setting the two switches (Q3 and S), the output voltage may be set to 0.75Vo, Vo, 1.5Vo, and 2Vo under the same switching frequency. This means that for the same switching frequency, the output voltage can be adjusted from 0.75Vo to 2Vo, for a variation range of 3.

The above example shows how the output voltage can be changed with different combinations of the operating condition for Q3 and S. Table 6 shows the output voltage levels under different operating conditions for Q3 when S is off.

TABLE 6

Output Voltage under Different Operating Conditions of Q3

| | Case 21 | Case 22 | Case 23 |
|---|---|---|---|
| Q3 | on | off | sub-frequency control |
| S | off | off | off |
| Vo | Vo21 = K*Vo | Vo22 = Vo | Vo23 = K*Vo~Vo |

The following table shows the output voltage under different operating conditions of S, when Q3 is off.

TABLE 7

Output Voltage under Different Operating Conditions of S

| | Case 31 | Case 32 | Case 33 | Case 34 |
|---|---|---|---|---|
| S | off | on | sub-frequency control | duty cycle control |
| Q3 | off | off | off | off |
| Vo | Vo31 = Vo | Vo32 = 2Vo | Vo33 = Vo – 2Vo | Vo34 = Vo – 2Vo (continuous) |

It will be appreciated that the on and off operating conditions for $Q_3$ and S may be combined so that different output voltages can be achieved at same switching frequency.

Figure 29:
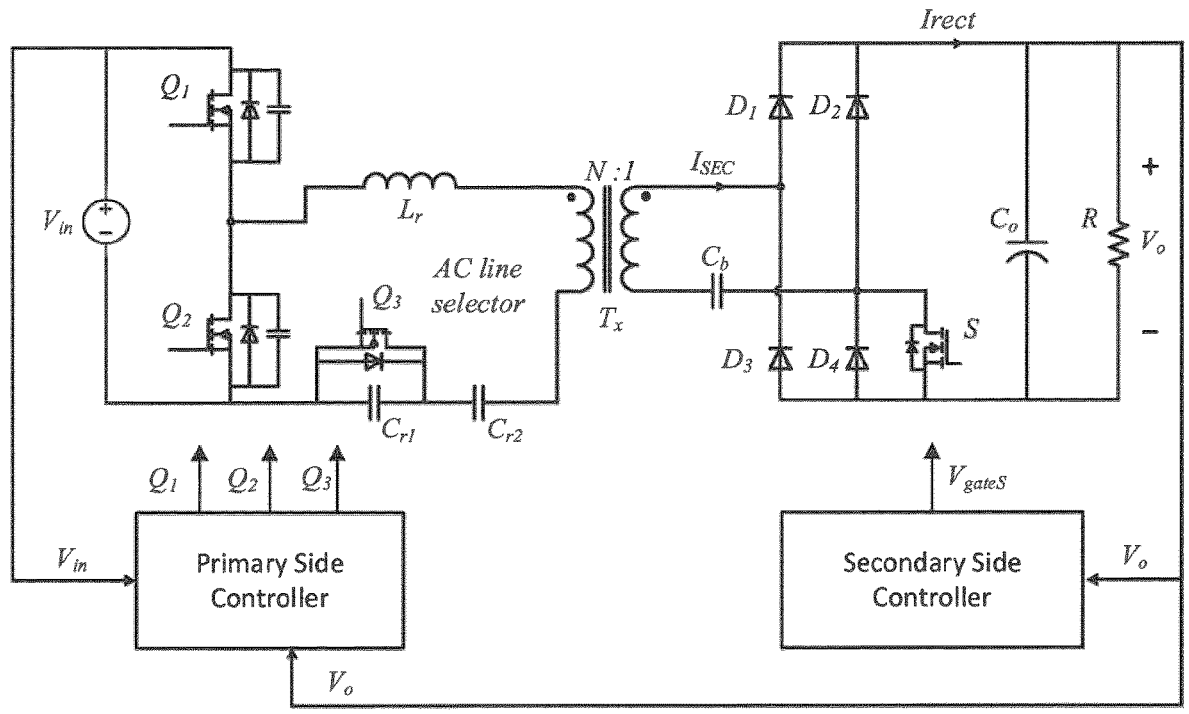
FIG. 29 is a schematic diagram showing controllers for the embodiment of FIG. 28, according to one embodiment.

FIG. 29 shows controllers used to achieve the above mentioned control strategy for the embodiment of FIG. 28. The primary side controller generates the gate signals for the primary side switches, which include the half bridge switches, Q1 and Q2, and the bypassing switch Q3. The input signals of the primary side controller may be input voltage Vin and output voltage Vo. The gate signals for Q1 and Q2 are 50% duty cycle with a small dead time in between. Switching frequency is changed to regulate the output voltage. Based on the operating conditions, the gate signal for Q3 may be a constant high voltage (on operation), a constant low voltage (off operation), or a sub-frequency switching signal that keep Q3 on for N switching periods and keep Q1 off for M switching periods.

The secondary side controller uses the output voltage as the input signal. Input voltage Vin may also be used as an input signal (not shown). Based on the operating conditions, the gate signal VgateS for the voltage doubler switch S may be a constant high voltage (S on all the time, voltage doubler operation), a constant low voltage (S off all the time, non-voltage doubler operation), or a duty cycle signal, or a sub-frequency signal.

Figure 30:
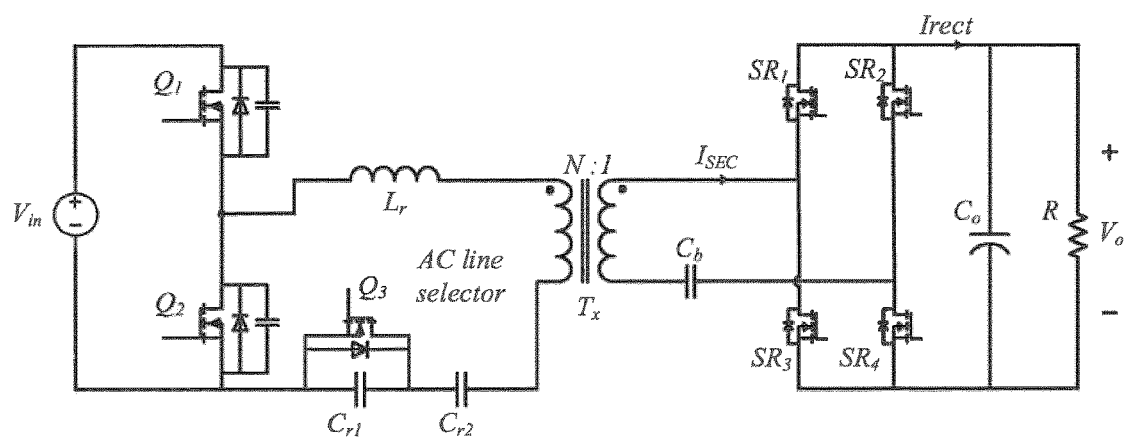
FIG. 30 is a schematic diagram of a series resonant converter with capacitor bypassing, according to another embodiment.

In the above discussion, it is assumed that diodes are used as full bridge rectifier. It is understood that a synchronous rectifier may also be used as the full bridge rectifier, as shown in the embodiment of FIG. 30. In this case, SR4 serves also as voltage doubler switch S.

FIG. 5A shows the gate drive signals for SR1 to SR4 under non-voltage doubler operation. In this operating condition, the gate signal of SR4 is same as the gate signal of SR1, and the gate signals for SR2 and SR3 are the same.

FIG. 5B shows the gate drive signals for SR1 to SR4 under voltage doubler operation. In this case, SR2 is off all the time (low gate voltage) and SR4 is on all the time (high gate voltage).

Figures 31A, 31B:
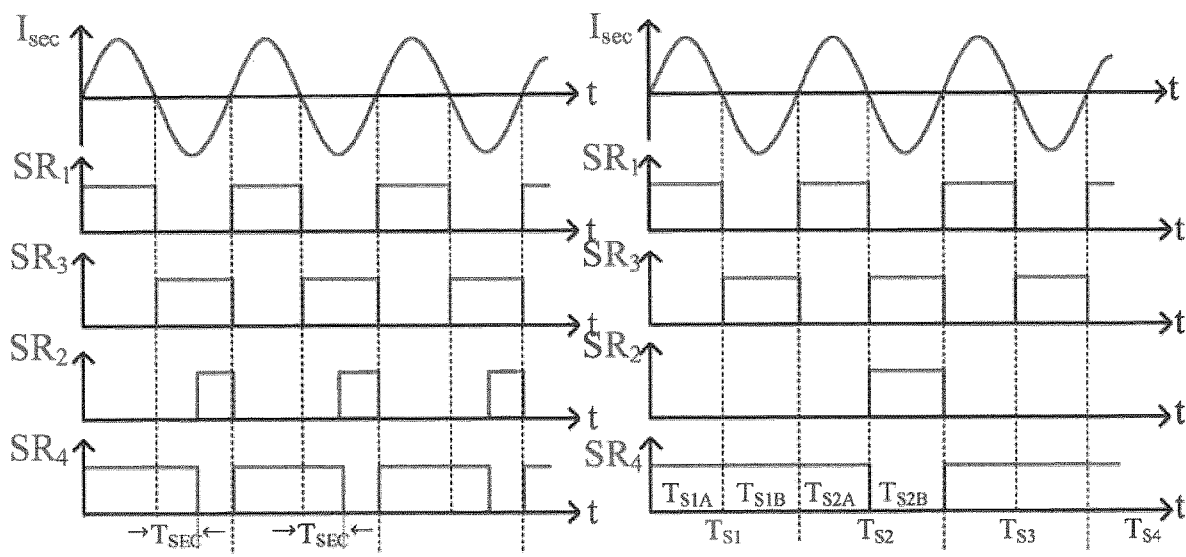
FIGS. 31A and 31B are timing diagrams for the embodiment of FIG. 30, according to one embodiment.

FIG. 31A shows the gate drive signals for SR1 to SR4 under duty cycle operating condition. In this case, SR4 will conduct longer ($T_{SEC}$) when the transformer secondary current is negative. The gate signal for SR2 is complimentary to the gate of SR4.

FIG. 31B shows the gate drive signals for SR1 to SR4 under sub-frequency operating condition, wherein the SR4 serves as the voltage doubler switch S (i.e., the control switch) and the synchronous rectifier switch (SR4 in this case). SR4 is on for the first half of the first switching period (Ts1A, when $I_{SEC}$ is positive) operating as synchronous rectifier. SR4 is on for the second half of the first switching period (Ts1B, when $I_{SEC}$ is negative) to operate as voltage doubler switch. In the second switching cycle, S is on for the first half (Ts2A, when $I_{SEC}$ is positive) as synchronous rectifier. It is turned off for the second half (Ts2B, when $I_{SEC}$ is negative) to operate as non-voltage doubler switch. The gate signals for SR1 and SR3 are same as in FIG. 31A. The gate signal of SR4 is high for the first switching period (Ts1), operating at voltage doubler mode. In the second switching period, the gate signal of SR4 is high when $I_{SEC}$ is positive and is low when $I_{SEC}$ is negative value. SR2 is complimentary of SR4. SR2 is off during first switching period. In second switching period, SR2 is on when $I_{SEC}$ is negative.

In the above analysis it is assumed that the transformer secondary current is a sinusoidal waveform. The gate signals will be similar under a non-sinusoidal waveform.

The above embodiment may also be implemented using a full bridge primary configuration.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A resonant converter, comprising:
first and second primary side input terminals;
a primary side resonant circuit including two or more primary side switches;
a transformer having primary and secondary windings;
a secondary side rectifier circuit;
output points of the secondary side rectifier circuit connected to first and second secondary side output terminals;
an output capacitor connected across the first and second output terminals;
a secondary side blocking capacitor wherein a first terminal of the blocking capacitor is connected to the transformer secondary winding and a second terminal of the blocking capacitor is connected to a second input terminal of the rectifier circuit;
a secondary side control switch wherein a first terminal of the secondary side control switch is connected to the second terminal of the blocking capacitor and a second terminal of the secondary side control switch is connected to a second output point of the rectifier circuit; and
at least one controller that controls a switching frequency of the two or more primary side switches according to a lower switching frequency when the secondary side control switch is off, and according to a higher switching frequency when the secondary side control switch is on, and controls the secondary side control switch according to a first selected mode so that when the secondary side control switch is off, the output voltage of the resonant converter is Vo, and according to a second selected mode so that when the secondary side control switch is on, the output voltage of the resonant converter is 2Vo.

2. The resonant converter of claim 1, wherein the at least one controller controls a duty cycle of the secondary side control switch during a transition from off to on, wherein the duty cycle gradually increases from 0 to 1 during switching cycles over a first selected duration; and
wherein the at least one controller controls the duty cycle of the secondary side control switch during a transition from on to off, wherein the duty cycle gradually decreases from 1 to 0 during switching cycles over a second selected duration.

3. The resonant converter of claim 2, wherein the first selected duration corresponds to a duration in which the switching frequency of the two or more primary side switches is increasing; and
wherein the second selected duration corresponds to a duration in which the switching frequency of the two or more primary side switches is decreasing.

4. The resonant converter of claim 1, wherein the at least one controller controls a duty cycle of the secondary side control switch within each switching cycle;
wherein the output voltage of the resonant converter is determined by the duty cycle of the secondary side control switch within each switching cycle;
wherein the output voltage of the resonant converter is variable and is regulated at a value from Vo to 2Vo.

5. The resonant converter of claim 1, wherein the at least one controller controls the secondary side control switch by:
turning on the secondary side control switch during alternating negative halves of the transformer secondary current cycle; and otherwise turning off the secondary side control switch;
wherein the output voltage of the resonant converter is variable and is regulated at a value from Vo to 2Vo.

6. The resonant converter of claim 1, wherein the at least one controller controls the secondary side control switch by:
turning on the secondary side control switch during a selected number of consecutive negative halves of a transformer secondary current cycle;
turning off the secondary side control switch during a selected number of consecutive negative halves of the transformer secondary current cycle; and
otherwise turning off the secondary side control switch;
wherein the output voltage of the resonant converter is variable and is regulated at a value from Vo to 2Vo.

7. The resonant converter of claim 1, further comprising a primary side control switch;
wherein a reactive element of the primary side resonant circuit comprises first and second reactive elements;
wherein the primary side control switch is connected to the first and second reactive elements;
wherein the at least one controller controls the primary side control switch according to a third selected mode;
wherein the third selected mode changes a total reactance of the first and second reactive elements;
wherein a voltage at the first and second output terminals is variable between K*Vo and 2Vo, where K is a number between 0 and 1, according to the first, second, and third selected modes.

8. The resonant converter of claim 7, wherein the at least one controller controls the primary side control switch according to a mode wherein the control switch is alternately off and on during consecutive switching cycles of the two or more primary side switches;
wherein the voltage at the first and second output terminals is between K*Vo and Vo, where K is a number between 0 and 1.

9. A method for implementing a resonant converter, wherein the resonant converter comprises:
first and second primary side input terminals;
a primary side resonant circuit including two or more primary side switches;
a transformer having primary and secondary windings;
a secondary side rectifier circuit;
output points of the secondary side rectifier circuit connected to first and second secondary side output terminals;
an output capacitor connected across the first and second output terminals;
a secondary side blocking capacitor wherein a first terminal of the blocking capacitor is connected to the transformer secondary winding and a second terminal of the blocking capacitor is connected to a second input terminal of the rectifier circuit; and
a secondary side control switch wherein a first terminal of the secondary side control switch is connected to the second terminal of the blocking capacitor and a second terminal of the secondary side control switch is connected to a second output point of the rectifier circuit;
the method comprising controlling a switching frequency of the two or more primary side switches according to a lower switching frequency when the secondary side control switch is off, and according to a higher switching frequency when the secondary side control switch is on, and controls the secondary side control switch according to a first selected mode so that when the secondary side control switch is off, the output voltage of the resonant converter is Vo, and according to a second selected mode so that when the secondary side control switch is on, the output voltage of the resonant converter is 2Vo.

10. The method of claim 9, comprising controlling a duty cycle of the secondary side control switch during a transition from off to on, wherein the duty cycle gradually increases from 0 to 1 during switching cycles over a first selected duration; and
controlling the duty cycle of the secondary side control switch during a transition from on to off, wherein the duty cycle gradually decreases from 1 to 0 during switching cycles over a second selected duration.

11. The method of claim 10, wherein the first selected duration corresponds to a duration in which a switching frequency of the resonant converter is increasing; and
wherein the second selected duration corresponds to a duration in which the switching frequency of the resonant converter is decreasing.

12. The method of claim 9, comprising controlling a duty cycle of the secondary side control switch within each switching cycle;
wherein the output voltage of the resonant converter is determined by the duty cycle of the secondary side control switch within each switching cycle;
wherein the output voltage of the resonant converter is variable and is regulated at a value from Vo to 2Vo.

13. The method of claim 9, comprising controlling the secondary side control switch by:
turning on the secondary side control switch during alternating negative halves of the transformer secondary current cycle; and
otherwise turning off the secondary side control switch;
wherein the output voltage of the resonant converter is variable and is regulated at a value from Vo to 2Vo.

14. The method of claim 9, comprising controlling the secondary side control switch by:
turning on the secondary side control switch during a selected number of consecutive negative halves of a transformer secondary current cycle;
turning off the secondary side control switch during a selected number of consecutive negative halves of the transformer secondary current cycle; and
otherwise turning off the secondary side control switch;
wherein the output voltage of the resonant converter is variable and is regulated at a value from Vo to 2Vo.

15. The method of claim 9, wherein the resonant converter further comprises a primary side control switch;
wherein a reactive element of the primary side resonant circuit comprises first and second reactive elements;
wherein the primary side control switch is connected to the first and second reactive elements;
the method comprising controlling the primary side control switch according to a third selected mode;
wherein the third selected mode changes a total reactance of the first and second reactive elements;
wherein a voltage at the first and second output terminals is variable between K*Vo and 2Vo, where K is a number between 0 and 1, according to the first, second, and third selected modes.

16. The method of claim 15, comprising controlling the primary side control switch according to a mode wherein the control switch is alternately off and on during consecutive switching cycles of the two or more primary side switches;
wherein the voltage at the first and second output terminals is between K*Vo and Vo, where K is a number between 0 and 1.

* * * * *